US008023431B2

(12) United States Patent
Fleenor et al.

(10) Patent No.: US 8,023,431 B2
(45) Date of Patent: Sep. 20, 2011

(54) DIGITAL SUBSCRIBER LINE (DSL) TRACKING SYSTEM

(75) Inventors: Michael H. Fleenor, Greenville, NC (US); William Joyner, Tarboro, NC (US); Juanita Rhodes, Wilson, NC (US); Teri Williamson, Tarboro, NC (US); Ronald Clark, Nashville, NC (US); Sangeetha Bagavathy, Rocky Mount, NC (US); Amy H. Combs, Tarboro, NC (US); Todd Mallory, Battleboro, NC (US)

(73) Assignee: Embarq Holdings Company, LLC, Overland Park, KS (US)

( * ) Notice: Subject to any disclaimer, the term of this patent is extended or adjusted under 35 U.S.C. 154(b) by 744 days.

(21) Appl. No.: 11/506,718

(22) Filed: Aug. 18, 2006

(65) Prior Publication Data
US 2008/0219330 A1 Sep. 11, 2008

(51) Int. Cl.
*H04L 12/16* (2006.01)
*G01R 31/08* (2006.01)

(52) U.S. Cl. .................................. 370/254; 370/241
(58) Field of Classification Search .................. 370/254; 709/224
See application file for complete search history.

(56) References Cited

U.S. PATENT DOCUMENTS

| 6,721,750 | B1* | 4/2004 | Jones et al. | 707/100 |
|---|---|---|---|---|
| 7,265,754 | B2* | 9/2007 | Brauss | 345/440 |
| 2005/0174938 | A1* | 8/2005 | Richardson et al. | 370/230.1 |
| 2005/0206644 | A1* | 9/2005 | Kincaid | 345/440 |
| 2007/0097884 | A1* | 5/2007 | Chewning et al. | 370/254 |

* cited by examiner

*Primary Examiner* — Derrick Ferris
*Assistant Examiner* — Angel Brockman
(74) *Attorney, Agent, or Firm* — SNR Denton US LLP

(57) ABSTRACT

Digital Subscriber Line (DSL) concentrating systems and other equipment from various manufacturers may be tracked and monitored with a single DSL tracking tool. The DSL tracking tool functions as part of a system of computing devices and databases with various user interfaces. The DSL tracking tool can perform analyses and generate reports about DSL devices, DSL sites, DSL concentrating systems, and routers to aid service providers in provisioning and maintaining DSL equipment.

11 Claims, 30 Drawing Sheets

DIGITAL SUBSCRIBER LINE (DSL) TRACKING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Digital Subscriber Line (DSL) concentrating systems have several capacity sensitive aspects that are monitored to ensure that capacity limits are not reached unexpectedly. While the various DSL concentrating systems available from various manufacturers may provide reporting capabilities, the data is not consistently reported. There is no common access or common report format. In addition, some capacity issues cannot be managed by the DSL concentrating systems and must be handled by external tracking systems.

For a company to successfully monitor thousands of concentrating devices provided by different manufacturers serving millions of customers, a monitoring system is needed that can provide a uniform set of information with a uniform set of procedures.

SUMMARY

The principles of the present invention provide for a computer system configured to manage a set of digital subscriber line (DSL) devices operating in one or more networks. The computer system includes a processor and a memory, where the processor is operable to execute instructions that, when executed by the processor, cause the processor to collect a set of data associated with a set of DSL devices used to provide DSL services to customers. The set of data associated with the set of DSL devices may be stored into one or more storage devices. The stored set of data may be accessed and at least a subset of the set of data may be presented in a uniform format.

Another embodiment may include a computer system for tracking and reporting on one or more digital subscriber line (DSL) devices operating in a network. The computer system may include computer software executable on a computing device. The computer software may be configured to provide one or more user interfaces. One or more databases may be operable to store data associated with one or more DSL devices, and a computing device, which executes the computer software, may provide a user with the ability to view a forecast of a capacity limit of one or more DSL devices.

The principles of the present invention may also include a method for tracking a set of devices operating in one or more networks. The method may include collecting a set of data from the set of DSL devices to store into one or more databases, processing a subset of the data to generate operation data associated with the DSL device, and displaying the operation data in a graphical format to enable a user to view the operation data.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Acronyms and Shorthand Notations

Figure 1:
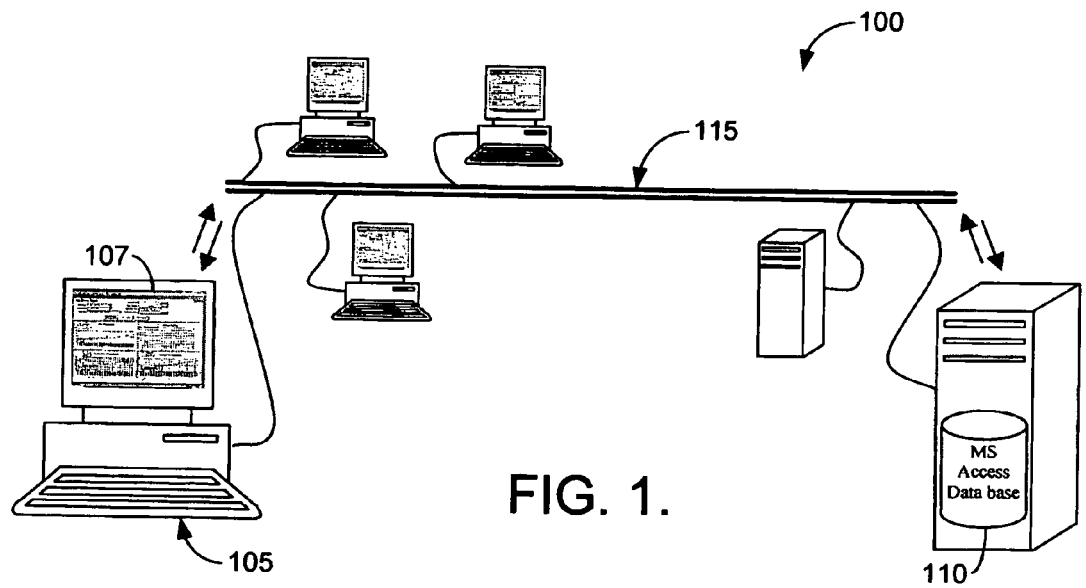
FIG. 1 is a block diagram of an exemplary operating environment implemented with a personal computer when practicing an embodiment of the present invention.

Throughout the description several acronyms and shorthand notations are used to aid the understanding of certain concepts pertaining to the associated system and services. These acronyms and shorthand notations are solely intended for the purpose of providing an easy methodology of communicating the ideas expressed herein and are in no way means to limit the scope of the present invention. The following is a list of these acronyms:

ADSL Asymmetric Digital Subscriber Line
    CLLI Common Language Location Identification
    DLC Digital Loop Carrier
    DSL Digital Subscriber Line
    DONS Delayed Order Notifications
    DSLAM Digital Subscriber Line Access Multiplexer
    HDSL High bit-rate Digital Subscriber Line
    KBPS Kilobits per second
    LAN Local Area Network
    PIC Plug-In-Card
    PSTN Public Switched Telephone Network
    RFE Request for Engineering
    SDSL Single-line Digital Subscriber Line
    SHDSL Single-pair High Speed Digital Subscriber Line
    WAN Wide Area Network Further, various technical terms are used throughout this description. A definition of such terms can be found in *Newton's Telecom Dictionary* by H. Newton, 21st Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program products. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and non-removable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions including data structures and program modules. Content or information including voice and/or data may be communicated in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example, but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

DSL Tracking System

In accordance with the principles of the present invention, a DSL tracking system is a tool designed to aggregate data about various DSL concentrating systems along with data gathered from other tracking systems. The tool supports users in planning activities to insure that DSL concentrating systems do not reach capacity exhaust unexpectedly. The tool also insures that additional capacity is planned in advance of reaching expected capacity limits. The tool may present the data in a format and allow evaluation of individual devices, multiple devices, and sites. In addition, forecast requests, forecast status, request for engineering input and update views may be provided by the tool to insure that the DSL concentrating systems do not reach capacity exhaust unexpectedly and to enable planning for additional capacity.

The DSL tracking system includes various components, such as a database designed to support, in a standard format, historical data elements about existing DSL concentrating systems. A user interface is included in the DSL tracking system to allow value users to access the system and various subcomponents of the tool. While operating the tool, a user may manually or automatically review stored historical data complimented with future projections of expected capacity exhaust dates. The user may (i) document in the database details of new DSL concentrating systems that have been placed into service, (ii) import into the database current information about the various DSL concentrating systems, (iii) receive manually entered data elements not available from other data systems, and (iv) provide periodic evaluations of the DSL concentrating systems Throughout this document, the terms capacity limit and capacity exhaust may be encountered. Both terms are used interchangeably in various context, but are meant to have the same meaning.

FIG. 1 is an illustration of an exemplary operating environment that may be implemented with a computing device 105, which may be any computing device, wireless device (not shown), or any other device capable of accessing a storage device 110 over a connection 115. Connection 115 may be a network connection to a network, such as a LAN, WAN, Intranet, and the Internet, that allows computing devices and storage devices to communicate. Computing device 105 executes computer software providing a graphical user interface 107 that operates or interfaces with the DSL tracking system. The computer software may access other systems (not shown) to store data into storage device 110. The systems may include a set of DSL concentrating systems or information gathered by other systems. Individual users may operate computer software via the graphical user interface 107 on their computing device 105, as shown by the other computing devices in FIG. 1, to access storage device 110, other storage devices, as depicted in FIG. 1 or the other systems.

Figure 2:
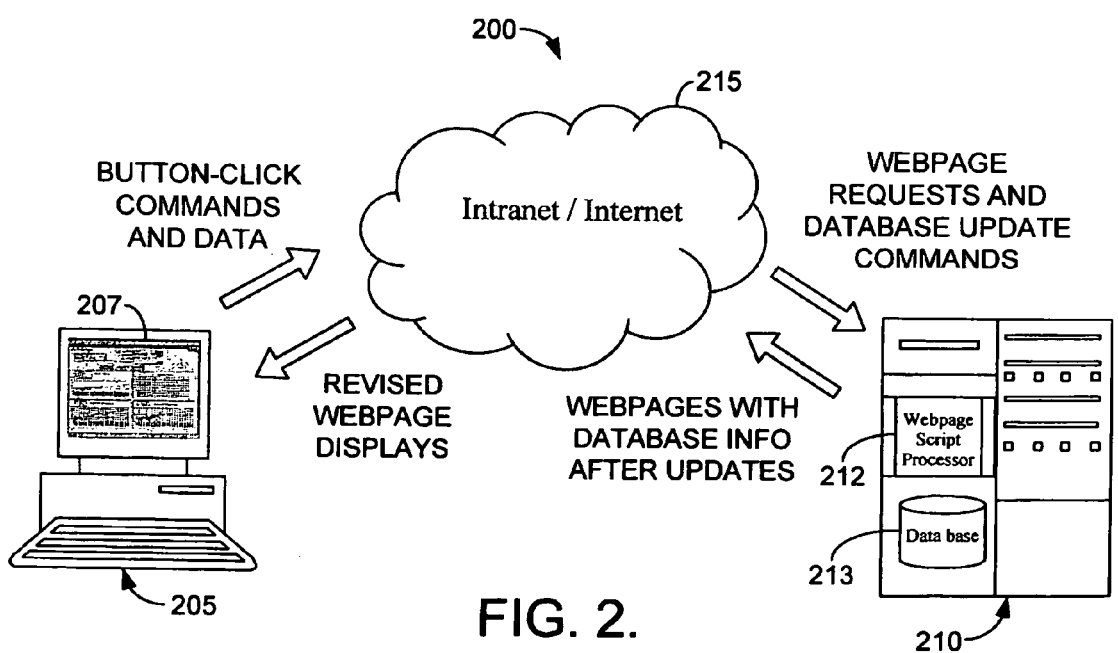
FIG. 2 is a block diagram of an exemplary operating environment implemented with a server when practicing an embodiment of the present invention.

FIG. 2 is an illustration of an exemplary operating environment 200 implemented with a server 210. Environment 200 is similar to environment 100 and illustrates that different embodiments of the present invention may be implemented with different devices. Environment 200 illustrates a computing device 205 with a web interface 207 displayed using computing device 205. Web interface 207 provides an interface to the server 210 that operates computer software 212 and storage device 213. Computing device 205 may access server 210 over a network connection 215. The network connection may be an intranet or the Internet.

Server 210 may execute computer software 212 to operate or interface with the DSL tracking system. Whereas the computer software providing the graphical user interface 107 (FIG. 1) operates locally on various computing devices, computer software 212 may operate on a server and provide multiple access to various users through a web interface shown by web interface 207. Server 210 may also contain storage device 213 to store data similar to storage device 110. Although in this embodiment, storage device 213 is shown within server 210, another embodiment may implement storage device 213 external to server 210 and accessible over network connection 215.

Computer software 212 operates the DSL tracking tool to access storage device 213 and interact with computing device 205. In addition, computer software 212 interacts with the various web interfaces that operate to access and retrieve information analyzed by computer software 212 or stored in storage device 213.

Similar to computing device 105, computing device 205 may be a computer, a workstation, a server, or a personal digital assistant with a web interface 207. Web interface 207 provides a user with an access over network 215. Network 215 may be an intranet connection or an Internet connection. Although FIG. 2 shows one computing device, the principles of the present invention may be implemented with various computing devices with network connections to server 210. Rather than operating the DSL tracking tool on a local computing device as shown in FIG. 1, a web-based DSL tracking tool may operate as shown in FIG. 2.

Figure 3:
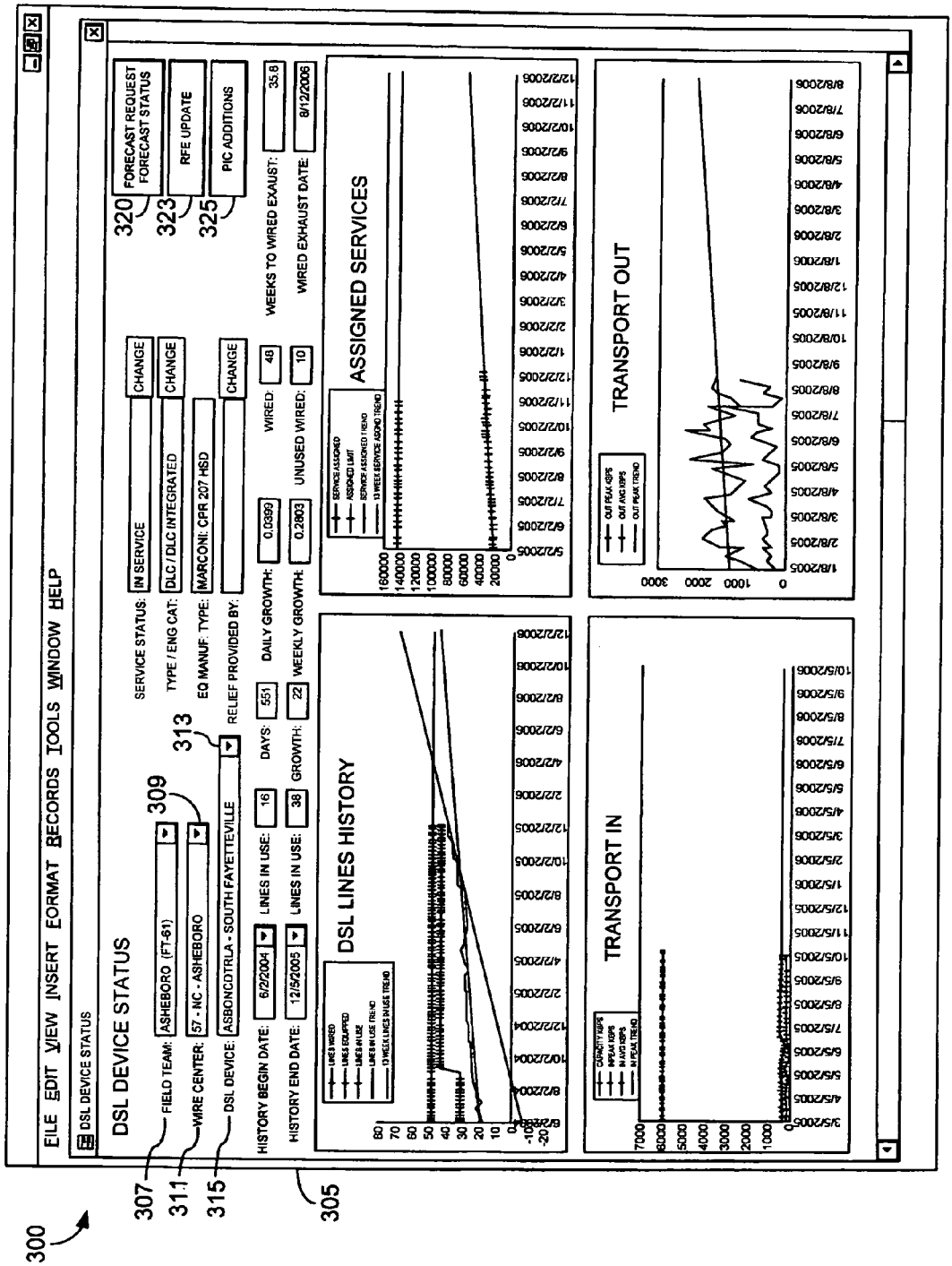
FIG. 3 is a screenshot of an exemplary output illustrating an overall DSL device status.

When the DSL tracking tool operates, a user has various options that may be selected depending on the embodiment of the present invention that is implemented. In FIG. 3, the user may operate computer software 107 or interact with computer software 212 to obtain a DSL device status. FIG. 3 illustrates a screenshot 300 of an exemplary output for the DSL device status 305.

With DSL device status 305, selection of a DSL device causes DSL device status 305 to populate with data and graphs that allows for a quick, high-level review of capacity and utilization aspects of the DSL device. For example, selecting field team 307 clears DSL device status 305 and reloads the wire center dropdown 309. Selecting wire center 311 clears DSL device status 305 and reloads the DSL device dropdown 313. DSL device status 305 remains clear of details until a DSL device is selected.

The upper portion of DSL device status 305 provides planning and engineering details about the selected device, including but not limited to service status, equipment type, engineering group, relief device, transport type, transport capacity, and network-ready date. Additional details may be added to provide a consolidated overview of a DSL concentrator device.

Below device name 315 are two date selectors that control the four graphs on the lower portion of the view. The beginning and ending date selectors may be automatically updated with actual dates of the data available for the selected device. Devices that have been in service for a long period of time will have a longer range of dates than devices that have only been in service for a short period of time.

To the right of the date selectors are buttons to access additional views for the selected device. The buttons may include Forecast Request & Forecast Status 320, RFE Updates 323, and PIC Additions 325. Clicking any of the buttons opens a new view that displays current data for the selected device and allows entry or update of information in the view.

The lower portion of DSL device status 305 contains four graphs. Initially the graphs may be reduced in size, thereby allowing the four graphs to be present in the view at the same time. The graphs are shrunken views of full size graphs discussed in later figures. In their shrunken view, numeric details may not be easily readable, so larger graphs may be selectively generated and displayed. For example, each graph may be expanded to full size by mouse-clicking anywhere within the graph. The full size graph may be shrunk back to its original size with a mouse-click within the graph area, for example.

Figure 4A:
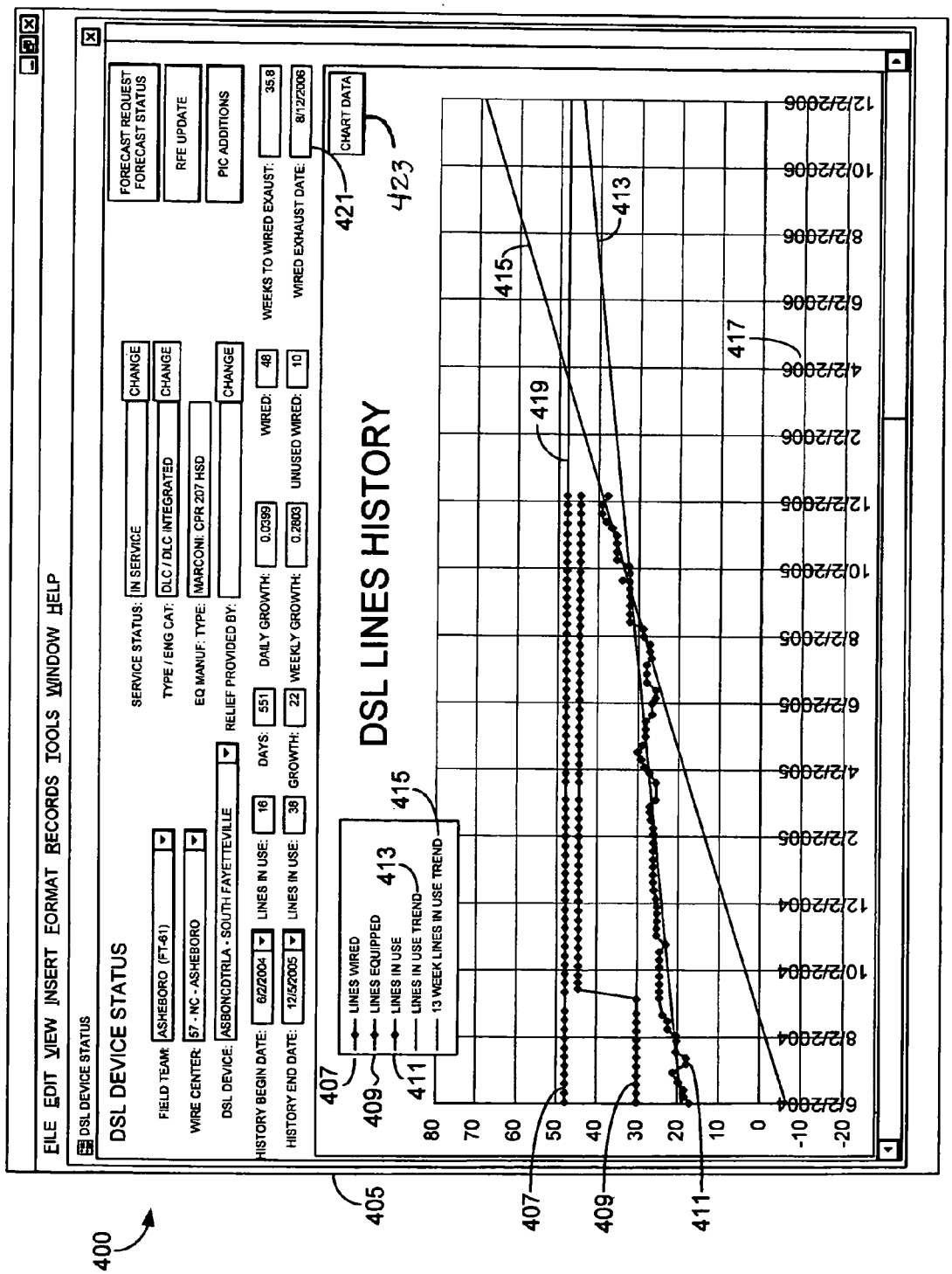
FIGS. 4A and 4B are screenshots of an exemplary output illustrating a DSL lines history.

In FIG. 4A, a screenshot 400 of an exemplary output illustrates DSL lines history. The DSL lines history 405 is an expanded view of the upper left graph from FIG. 3 showing DSL device status 305 and presents historical information about lines-in-use 411, installed 409, and wired 407, along with related trend lines 413 and 415. Trend line 413 may be based on all data points for lines-in-use 411, while another trend line 415 is based on the most recent thirteen (13) lines-in-use data points. Wired-lines trend line 419 defines the wired capacity limit level. Possible wired-line capacity limit date 417 may be identified at or near where either or both of the lines-in-use trend lines 413 and 415 intersect the wired-lines capacity line 419.

A theoretical capacity limit date 421 may be calculated and displayed above the graph based on line-in-use 411 on the starting and ending history dates. Lines-in-use 411 are displayed for each date, along with calculations of the number of days, total growth, growth rates, and weeks to theoretical wired capacity limit 421.

Figure 4B:
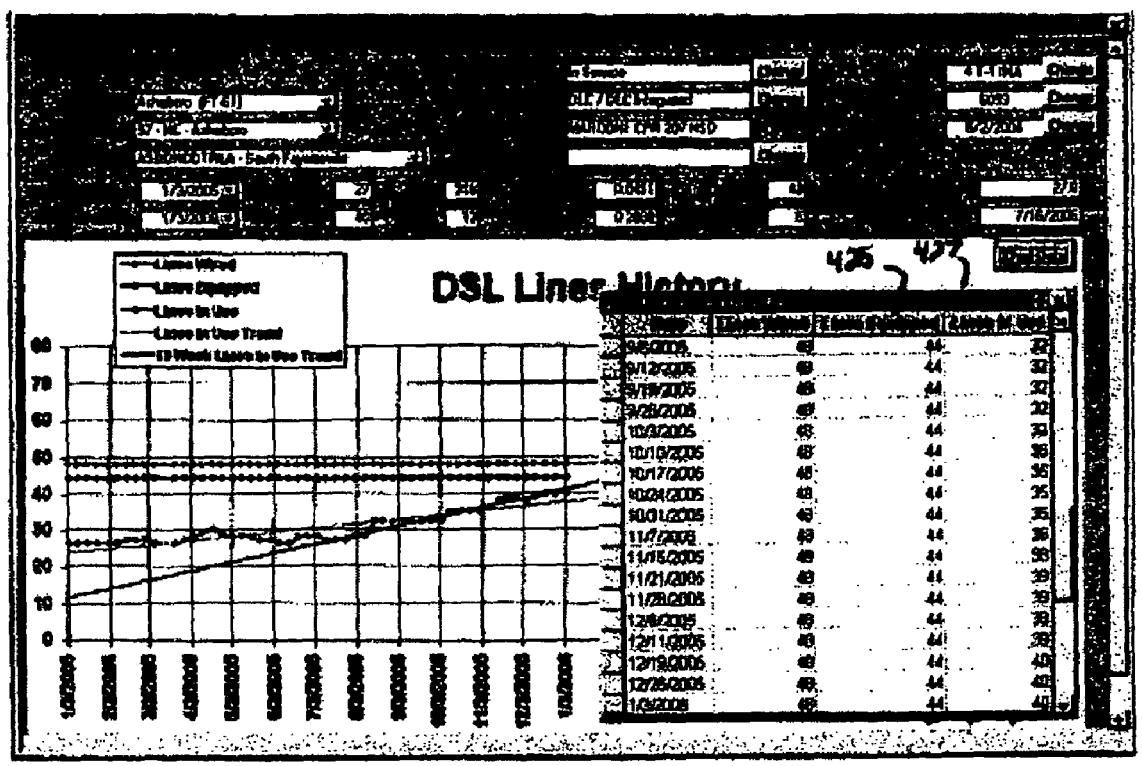

In one embodiment, a "Chart Data" soft-button 423 may be provided for a user to select to view a chart 425 with the data of FIG. 4B used to present the graph. The chart 425 may be displayed in a separate window 427 or otherwise. The chart 425 may include dates, lines wired, lines equipped, and any other data shown on the graph of FIG. 4A.

Figure 5A:
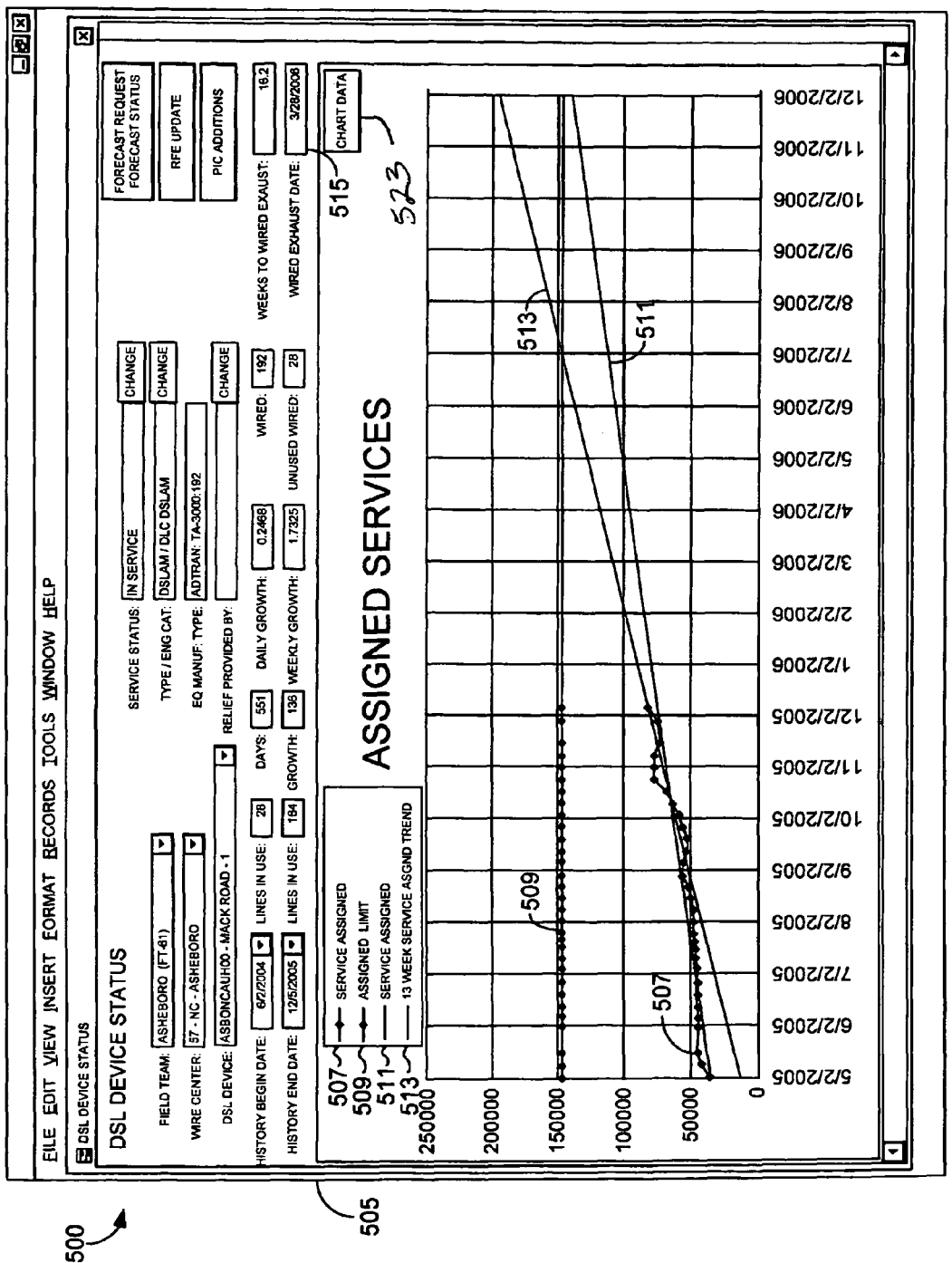
FIGS. 5A and 5B are screenshots of an exemplary output illustrating assigned services.

In FIG. 5A, a screenshot 500 of an exemplary output illustrates assigned services 505. The assigned services 505 is an expanded view of the upper right graph from FIG. 3 showing DSL device status 305 (assigned services 505) and presents historical information about the combined data-rate service levels 507 assigned to customers and a theoretical over-subscription assignment limit 509, along with related trend lines. The combined data-rate is calculated as the sum of the number of customers multiplied by their subscribed data-rate. Assignment limit 509 is calculated as the DSL concentrator's transport capacity multiplied by an over-subscription factor.

Trend line 511 is based on all assigned service data points and trend line 513 is based on the most recent 13 assigned service data points. Theoretical assigned service capacity limit date 515 may be calculated and displayed above the graph based on the sum of services assigned on the starting and ending history dates.

Figure 5B:
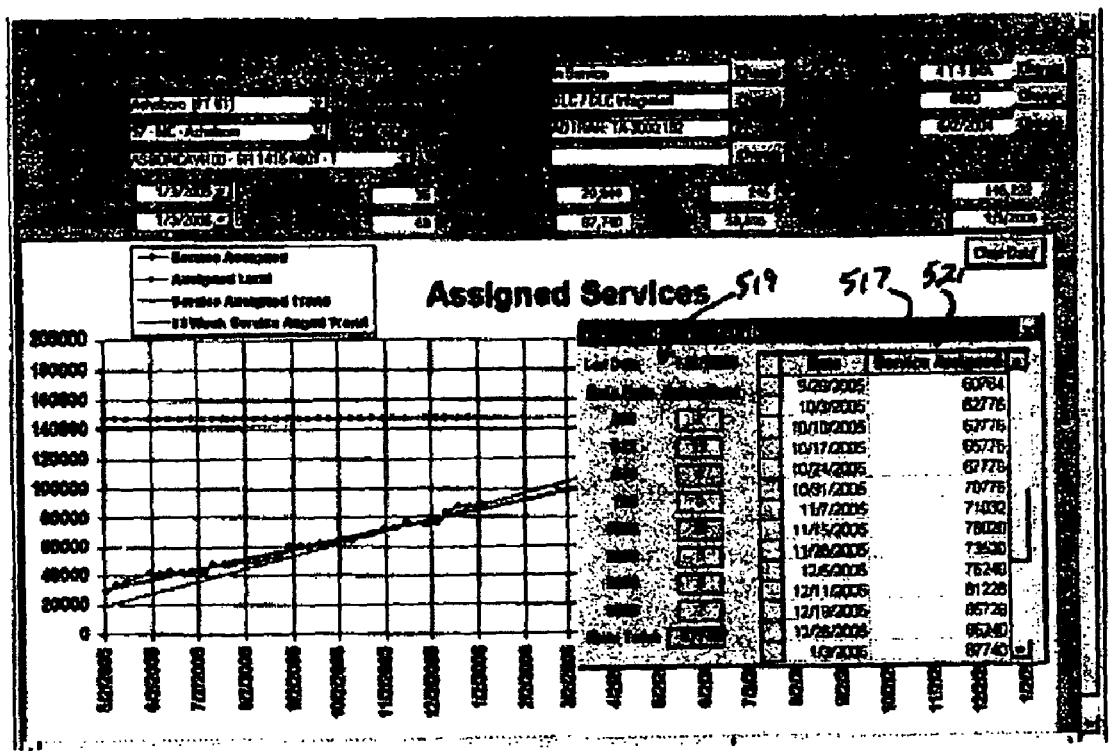

In FIG. 5B, a window 517 may include a data portion 519 and chart portion 521. The data portion 519 information, such as data rate, the number of subscribers at the data rate, and the total rate used based on those values, may be displayed. The chart portion 521 may show dates services assigned, and any other data used to produce the graph of FIG. 5A. A "Chart Data" soft-button 523 (FIG. 5A) may be selected to display the window 517.

Figure 6A:
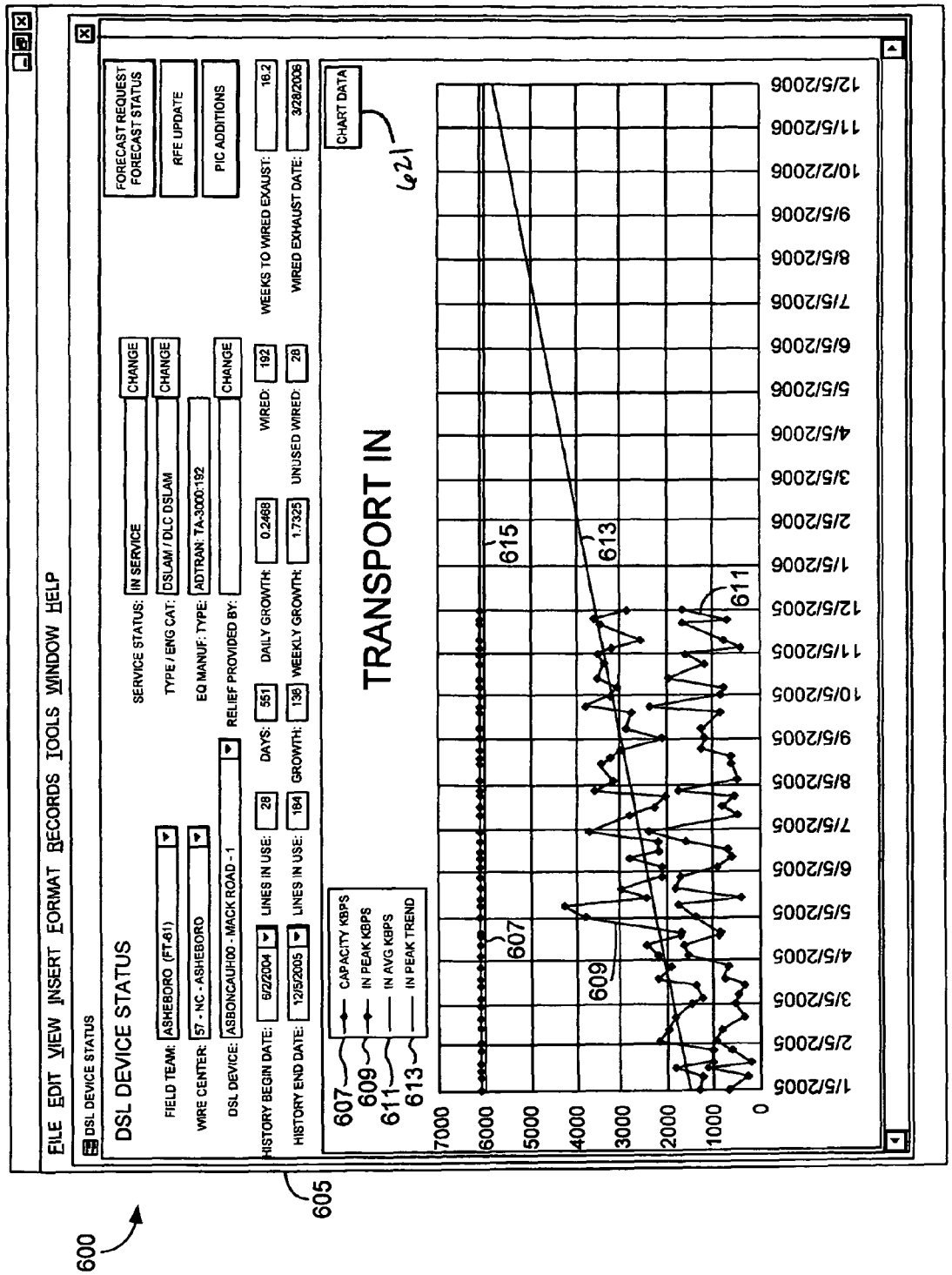
FIGS. 6A and 6B are screenshots of an exemplary output illustrating transport in (downstream) capacity utilization.

In FIG. 6A, a screenshot 600 of an exemplary output illustrates transport in (downstream) capacity utilization 605. The capacity utilization 605 is an expanded view of the lower left graph from FIG. 3 showing DSL device status 305 and presents historical information about transport in (downstream) capacity utilization. The graph presents peak utilization 609, average transport utilization 611, device transport capacity 607, and associated trend lines 613 and 615, respectively. The peak and average data values are for the seven-day peak busy-hour for the DSL device. Other time periods may be used for calculating and displaying the peak utilization 609 and average transport utilization 611.

Trend line 613 is based on all transport in peak usage values, and another trend line (not shown) may be based on the most recent 13 week transport in peak usage values. Transport capacity 607 and capacity trend line 615 provide reference for the utilization data and trend lines.

Figure 6B:
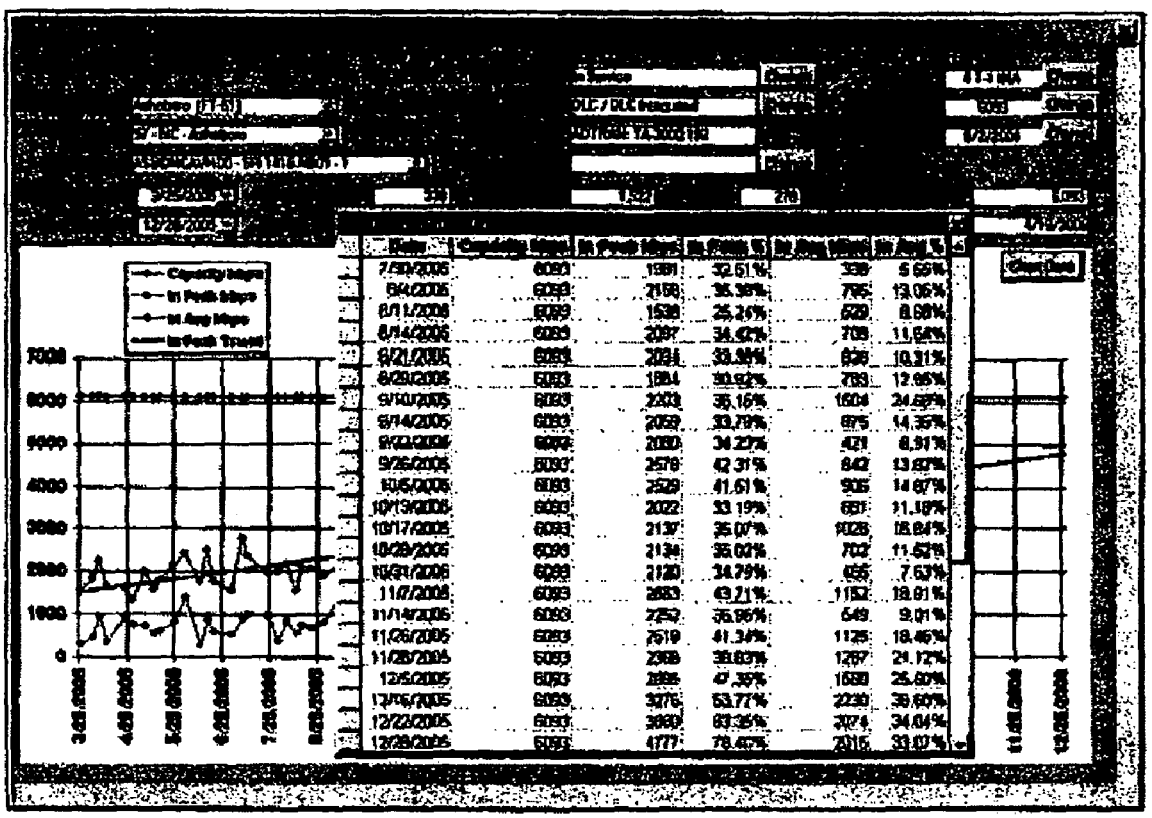

FIG. 6B is a window 617 including a chart 619 that may be displayed by selecting a "Chart Data" soft-button 621 of FIG. 6A. The chart may include data used to produce the graph of FIG. 6A and other data not shown on the graph. For example, the data in the chart may include date and capacity information, and may also include peak and average utilization percentages, which are not depicted on the graph of FIG. 6A.

Figure 7:
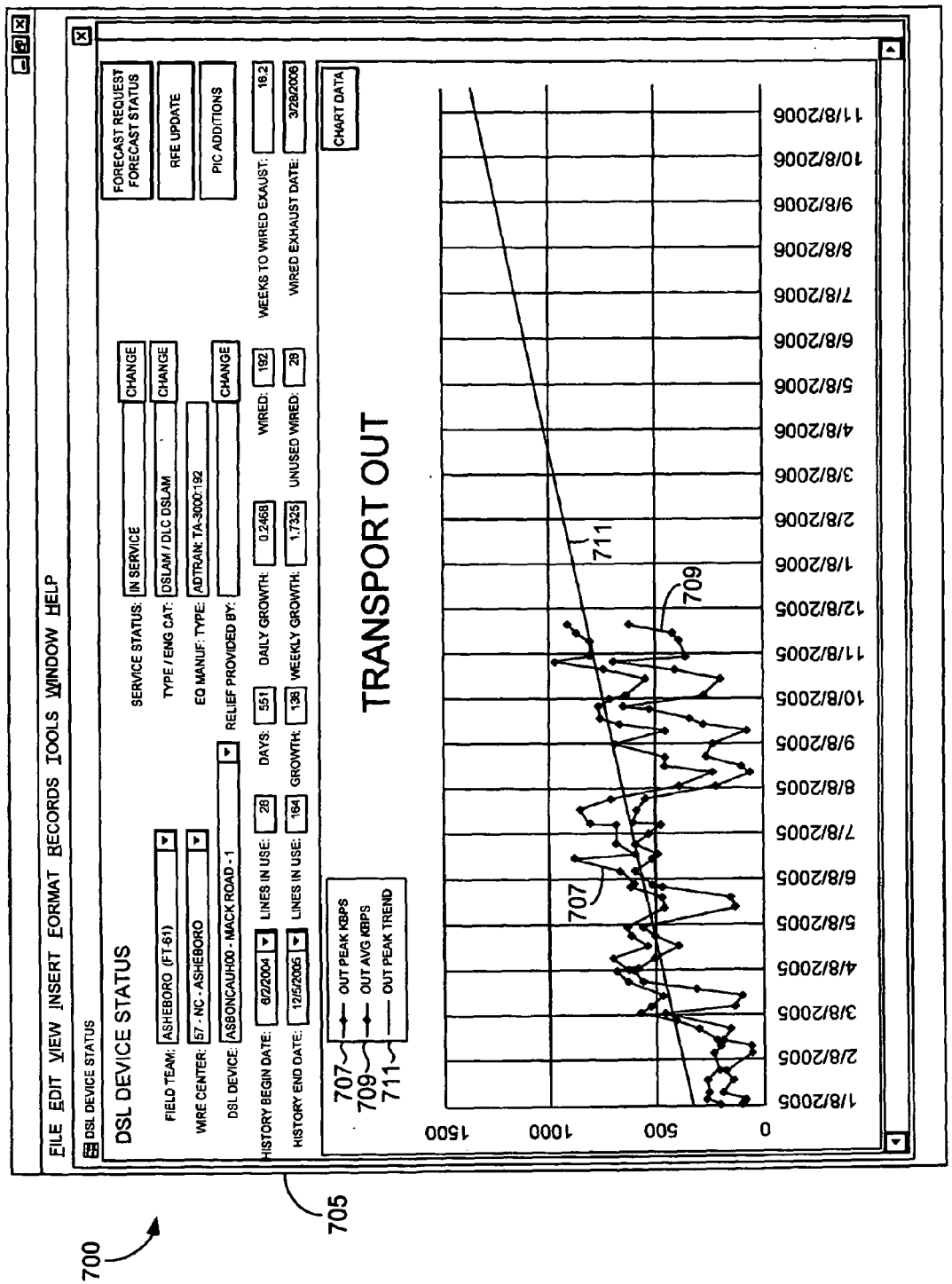
FIG. 7 is a screenshot of another exemplary output illustrating transport out (upstream) capacity utilization.

In FIG. 7, a screenshot 700 of another exemplary output illustrates transport out (upstream) capacity utilization 705. The capacity utilization 705 is an expanded view of the lower right graph from DSL device status 305 and presents historical information about transport out (upstream) capacity utilization. The graph presents peak utilization 707 and average transport utilization 709, and associated trend line 711. Transport capacity is not shown on the chart. As with the transport in data of FIG. 6A, the data values of peak and average utilization 707 and 709 are for the seven-day peak-busy hour for the DSL device. Alternative date ranges may be utilized for calculating and displaying the peak and average utilization.

Trend line 711 is based on all transport out peak usage values, and another trend line (not shown) may be based on the most recent 13 week transport in peak usage values. Other trend lines may be alternatively and/or additionally shown. It should be understood that a chart view may be displayed by selecting a soft-button, where the chart includes data representative in the graph of FIG. 7 and data not depicted in the graph.

Figure 8:
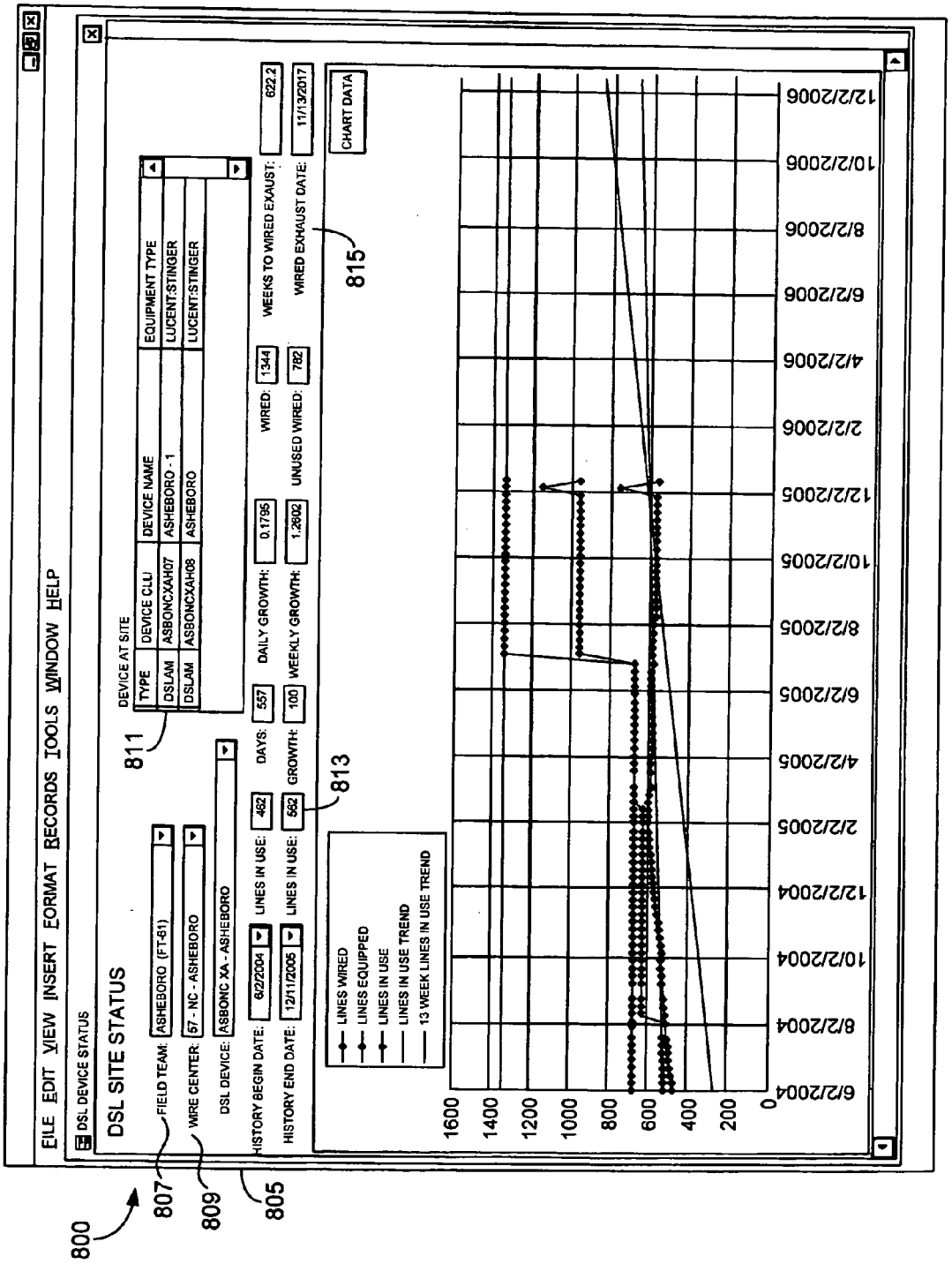
FIG. 8 is a screenshot of an exemplary output illustrating a DSL site status.

In FIG. 8, a screenshot 800 of an exemplary output illustrates a DSL site status 805. DSL site status 805 is similar to DSL device status 305 (FIG. 3). A list of aggregated devices may be displayed at the top of the output.

DSL concentrating devices are located at "sites" with a site being identified by the first eight characters of a CLLI code. DSL Site Status 805 allows a review of the aggregated total of working lines at a selected site. Selection of a site is similar to the selection process for a DSL device. Field team 807 and wire center 809 result in a list of sites within the selected wire center.

The upper portion of DSL Site Status 805 may display a list 811 of DSL devices at the site. The lower portion of DSL Site Status 805 may display a working line graph similar to the working lines graph in FIGS. 3 and 4, except that the lower portion is an aggregate total of the working lines information for all devices listed in list 811. Assigned services and transport utilization are device specific issues and are not included in the site status view.

Continuing with FIG. 8, date selection controls above the graph provide the same date selection and graph refresh functions available in FIGS. 3-7. Aggregated lines-in-use 813 and theoretical capacity limit date 815 may be computed and displayed just above the graph area.

Figure 9:
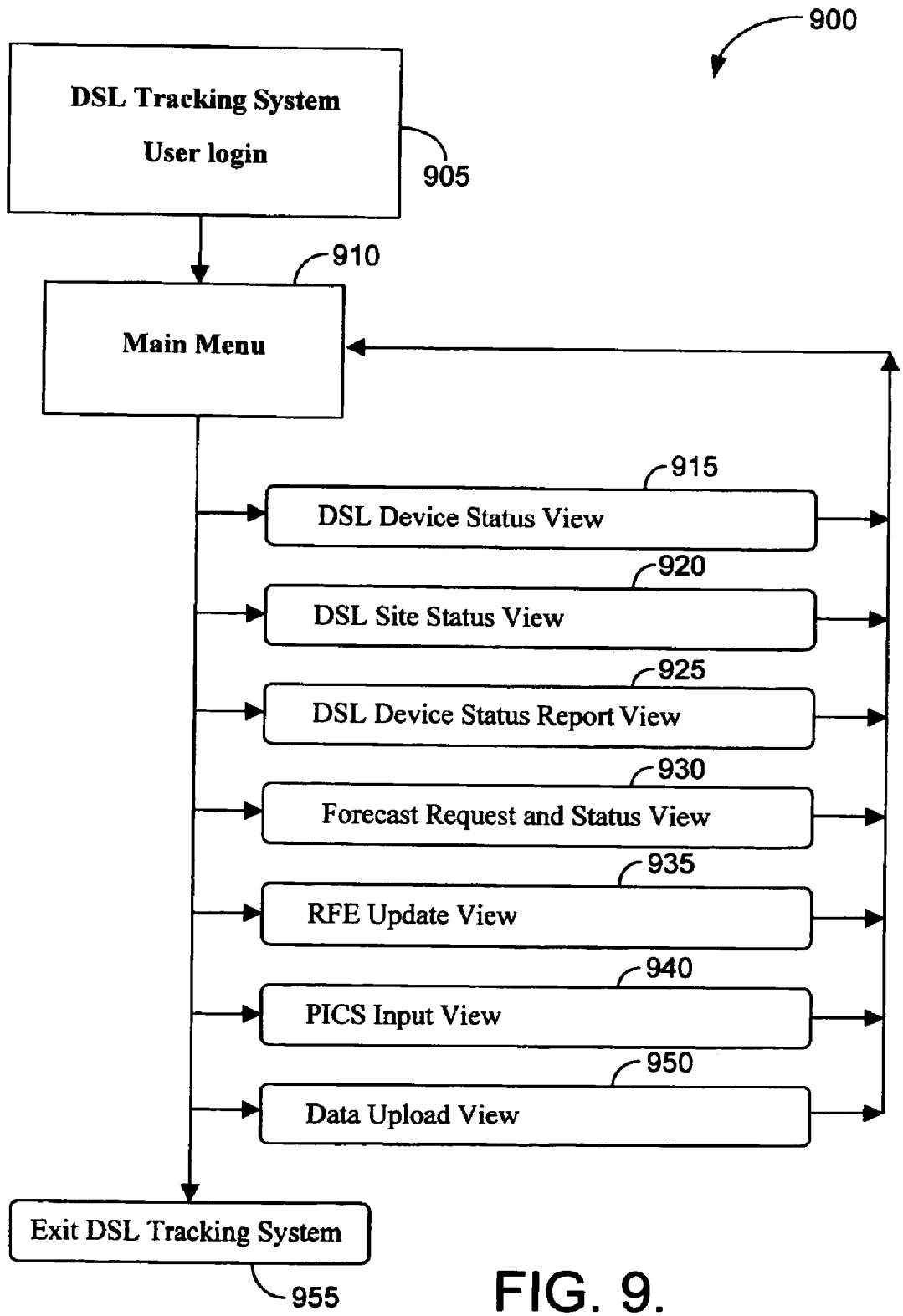
FIG. 9 is a flowchart of an exemplary process for a DSL Tracking System implemented in an embodiment of the present invention.

Turning now to FIG. 9, a flow chart of an exemplary process 900 for a DSL tracking system is provided. The process 900 may begin with a user login at step 905. A user may be shown a main menu in a step 910. From the main menu, various selections may be made identified by corresponding steps.

In step 915, DSL Device Status 305 (FIG. 3), may be viewed, and corresponding information may be analyzed and reported. In step 920, DSL Site Status 805 (FIG. 8) may be viewed and corresponding information may be analyzed and reported. In step 925, a DSL Status Report may be created and viewed. In step 930, a Forecast Request and Status may be created and viewed. DSL planners may document and track forecast requests. Demand planners may document and track responses to requests-for-forecasts and the status of requested forecasts. In step 935, an RFE Update may be created and viewed. DSL planners may document and track RFEs. In step 940, a PICS Input may be created and viewed. A user may document PIC additions. In step 950, a Data Upload may be created and viewed, and imported or exported. In step 955, the DSL tracking system may be exited.

Figure 10:
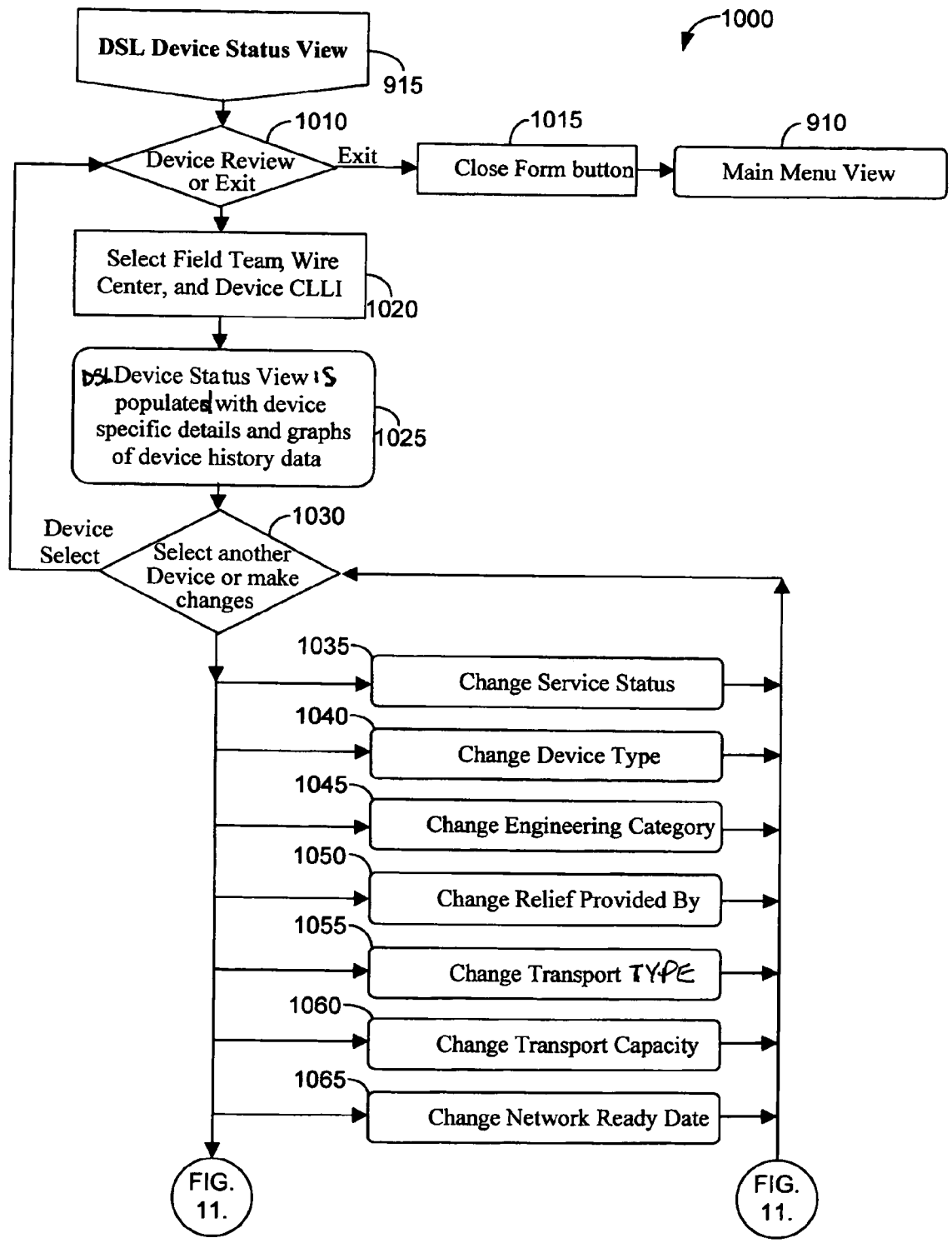
FIG. 10 is a flowchart of an exemplary process for a DSL Device Status View implemented in an embodiment of the present invention.

In FIG. 10, a flow chart of an exemplary process 1000 for viewing DSL Device Status 305 is shown. The process 1000 is a continuation of the process 900 (FIG. 9) and begins with step 915 from FIG. 9. In step 1010, a user has an option to exit or to continue. If the user exits, a close form button is selected in a step 1015 and the user is taken back to the main menu to step 910 of FIG. 9.

If the user continues in step 1010, the user may select field term, wire center, and device CLLI in step 1020. DSL Device Status 305 may be populated with device specific detail and graphs of device history data in step 1025. The user has another option to select whether to access another device or to make changes in step 1030.

If the user decides to make changes, the user may change service status in step 1035, change device type in step 1040, change engineering category in step 1045, change relief provided by in step 1050, change transport type in step 1055, change transport capacity in step 1060, or change network ready data in step 1065.

Figure 11:
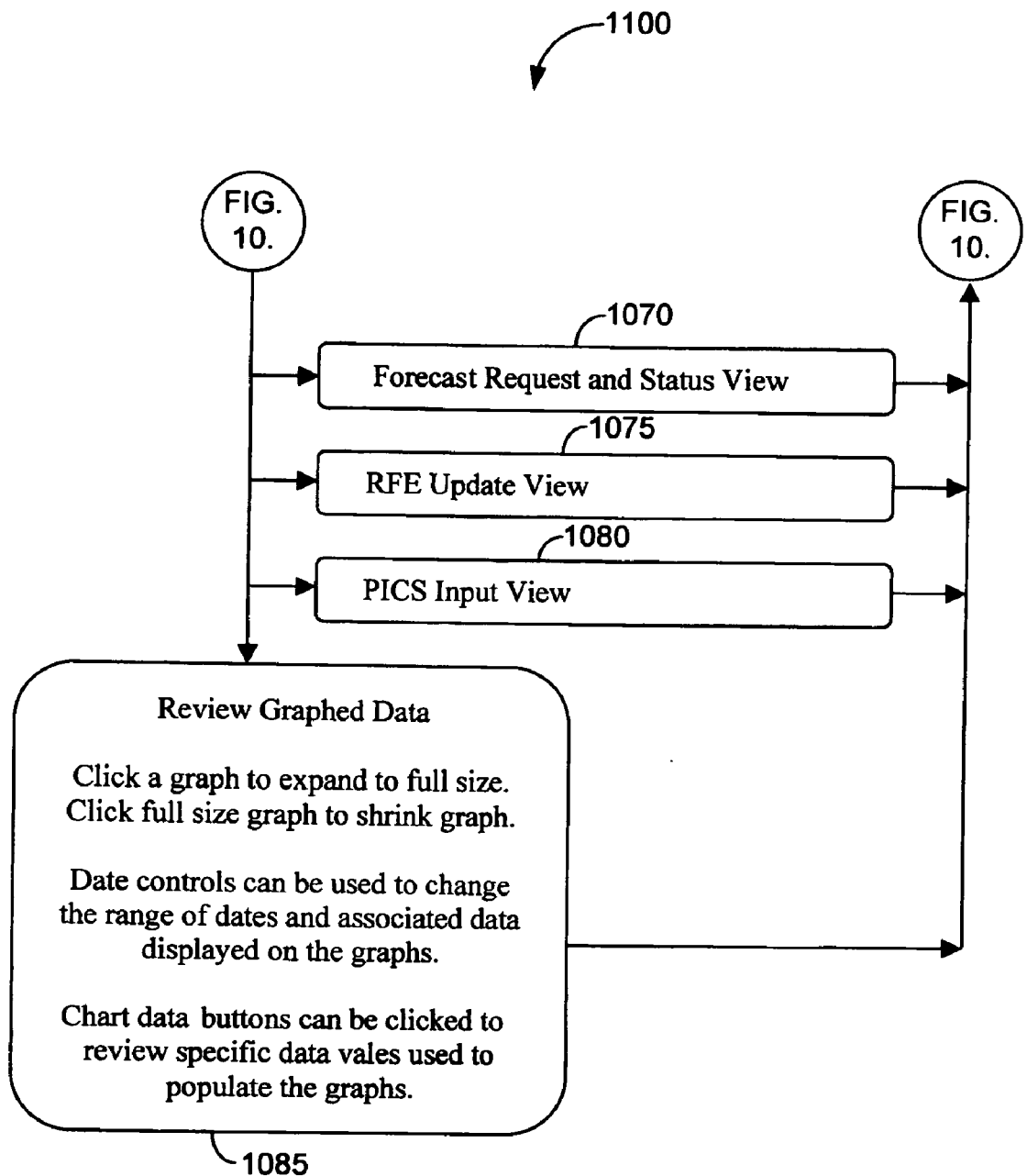
FIG. 11 is a flowchart showing a continuation of the exemplary process of FIG. 10 for the DSL Device Status View implemented in an embodiment of the present invention.

In FIG. 11, a flow chart of a process 1100, which is a continuation of the process 1000 for viewing DSL Device Status 305 is shown. The process 1100 continues the process 1000 (FIG. 10) with the option for making changes. In step 1070, the user may select a Forecast Request and Status View. In step 1075, an RFE Update view may be selected. In step 1080, a PICS input view may be selected. From the changes made or not made, the user may review graphed data in step 1085.

Figure 12:
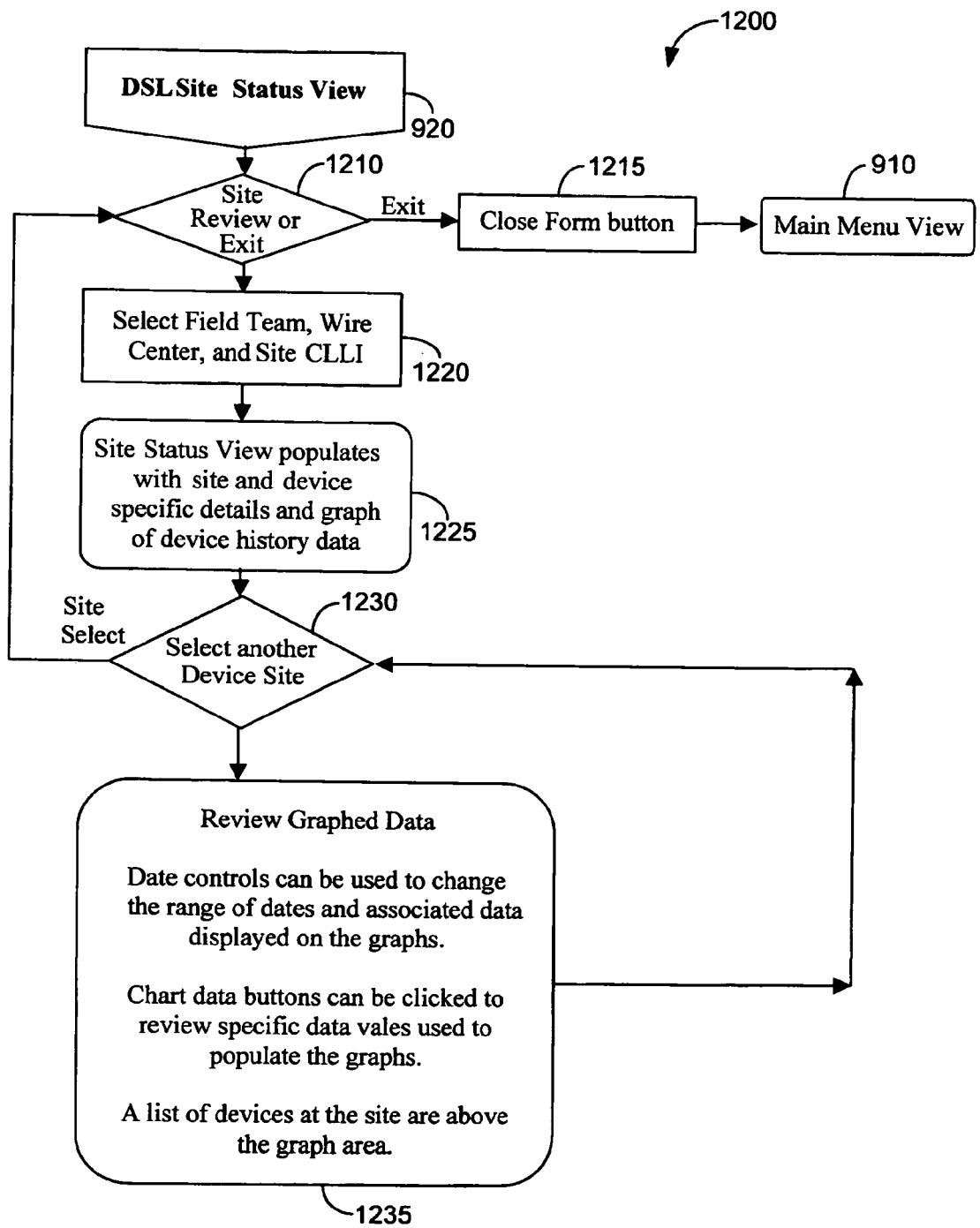
FIG. 12 is a flowchart of an exemplary process for a DSL Site Status View implemented in an embodiment of the present invention.

In FIG. 12, a flow chart of an exemplary process 1200 for viewing DSL Site Status 805 (FIG. 8) is shown. The process 1200 is a continuation of process 900 (FIG. 9) and begins with step 920 from FIG. 9. In step 1210, the user has an option to exit or continue. If the user exits, a close form button is selected in step 1215 and the user is taken back to the main menu to step 910 of FIG. 9.

If the user continues in step 1210, the user may select field team, wire center, and device CLLI in step 1220. DSL Site Status 805 may be populated with site and device specific details and graphs of device history data in step 1225. The user has another option to select whether to access another site. From the selections made, the user may review graphed data in step 1235.

Figure 13:
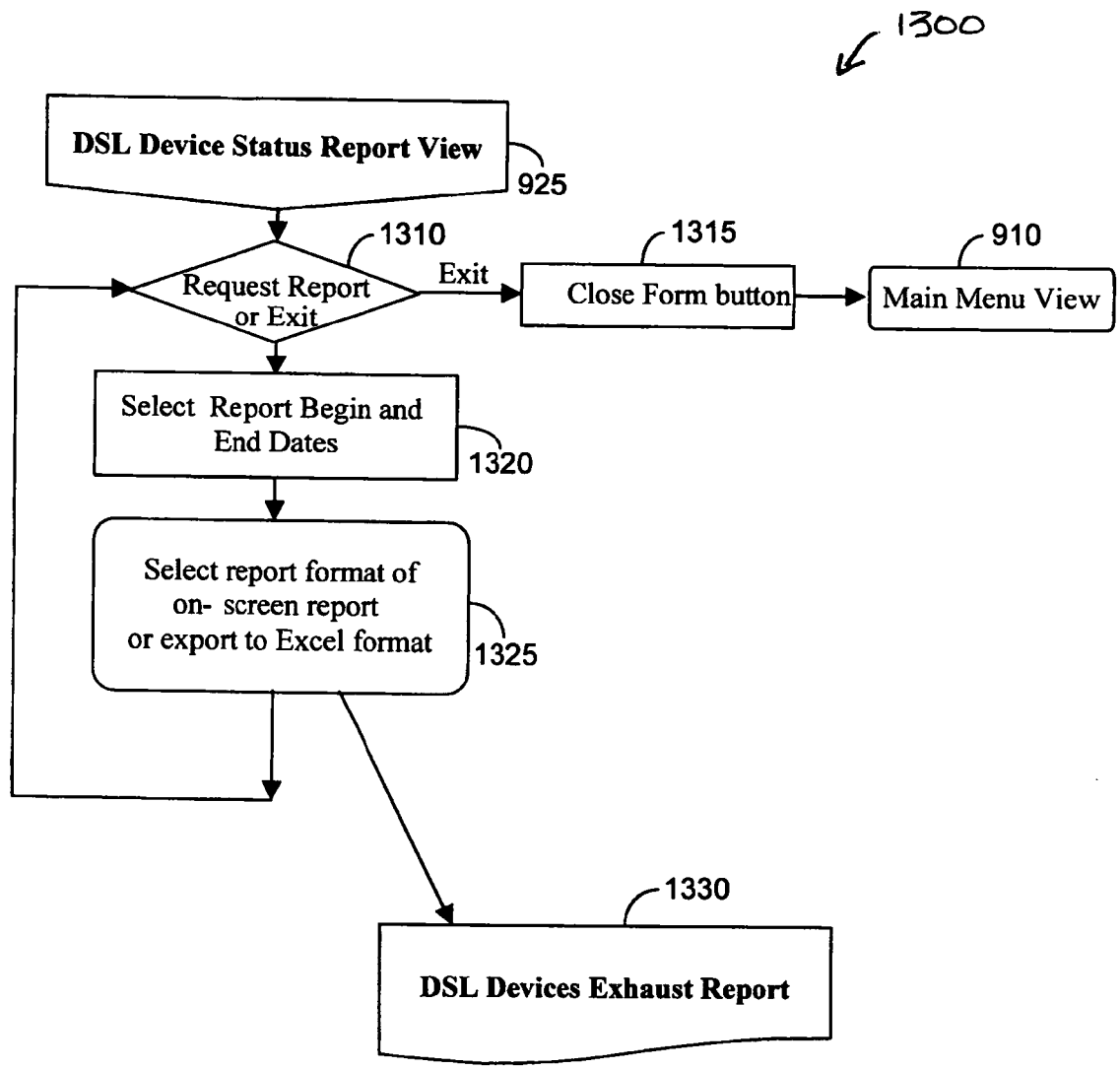
FIG. 13 is a flowchart of an exemplary process for a DSL Device Status Report View implemented in an embodiment of the present invention.

In FIG. 13, a flow chart of an exemplary process 1300 for displaying a DSL Device Status Report is shown. The process 1300 is a continuation of process 900 (FIG. 9) and begins with step 925 from FIG. 9. In step 1310, the user has an option to exit or to continue. If the user exits, a close form button is selected in step 1315 and the user is taken back to the main menu in step 910.

If the user continues in step 1310, the user may select report begin and end dates in step 1320. The user may select report format for producing an on-screen report or export to another file or application in step 1325. In step 1330, a DSL device capacity limit report may be created.

Figure 14:
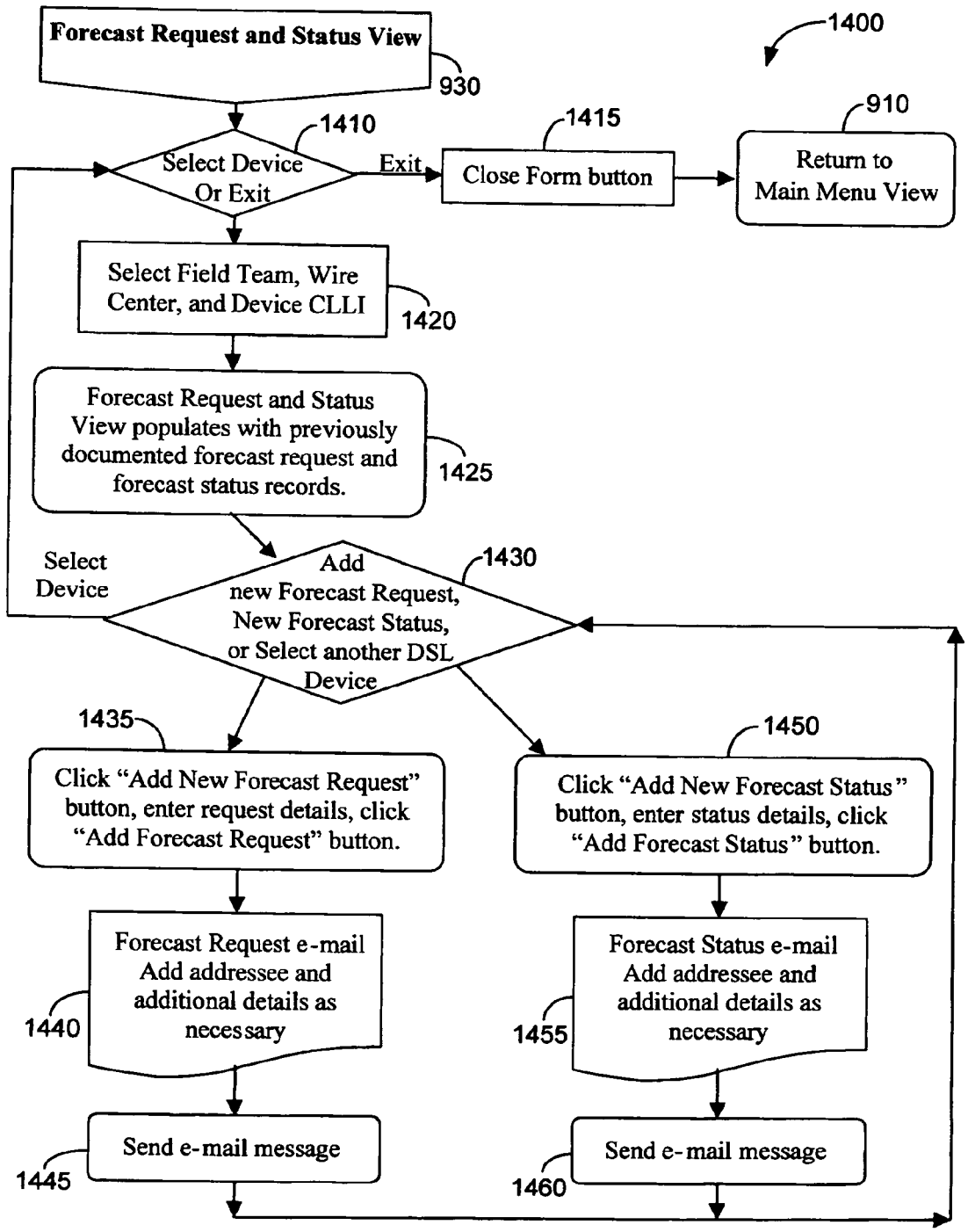
FIG. 14 is a flowchart of an exemplary process for a Forecast Request and Status View implemented in an embodiment of the present invention.
Figure 19A:
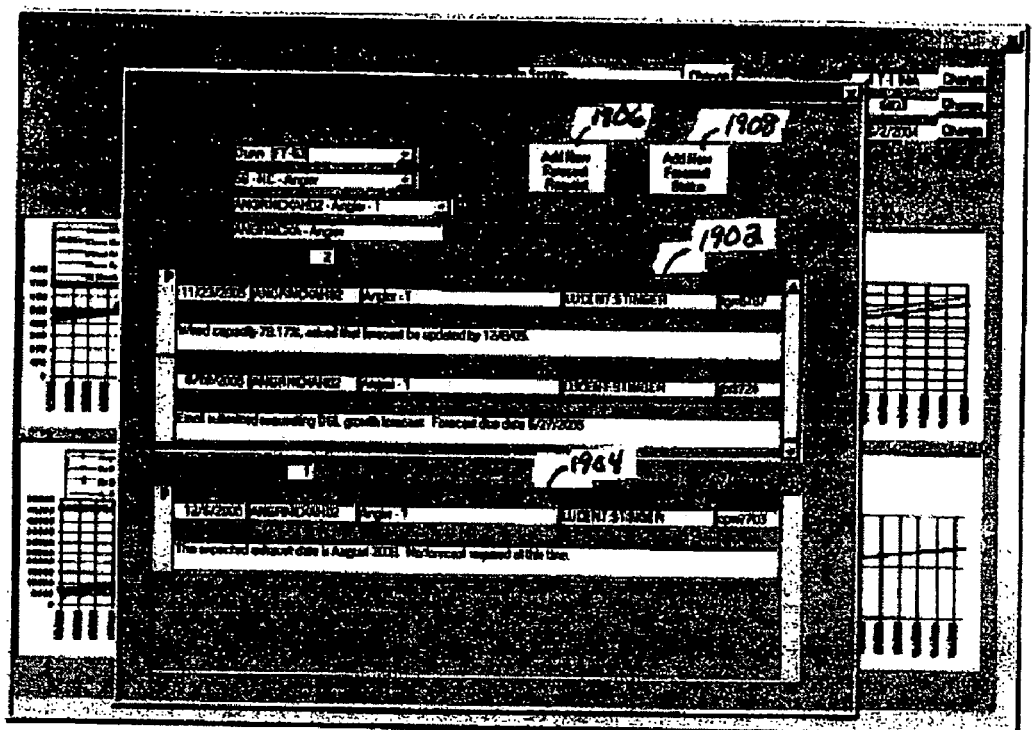
FIGS. 19A-19D are screenshots of exemplary DSL Forecast Request and Status View input Forms.

In FIG. 14, a flow chart for an exemplary process 1400 for viewing a DSL Forecast Request and Status View is shown. An exemplary DSL Forecast Request and Status View 1900 is shown in FIG. 19A. The process 1400 is a continuation of process 900 (FIG. 9) and begins with step 930 from FIG. 9. In step 1410, the user has an option to exit or to continue. If the user exits, a close form button is selected in step 1415 and the user taken back to the main menu in step 910.

If the user continues in step 1410, the user may select field team, wire center, and device CLLI in step 1420. A Forecast Request and Status view may be populated with previously documented forecast request 1902 (FIG. 19A) and forecast status 1904 records in step 1425. These records may be sorted chronologically with the most recent entry at the top of the respective records. The user has another option to select whether to access another device, add new forecast request via soft-button 1906, or add new forecast status via soft-button 1908 in step 1430.

Figure 19B:
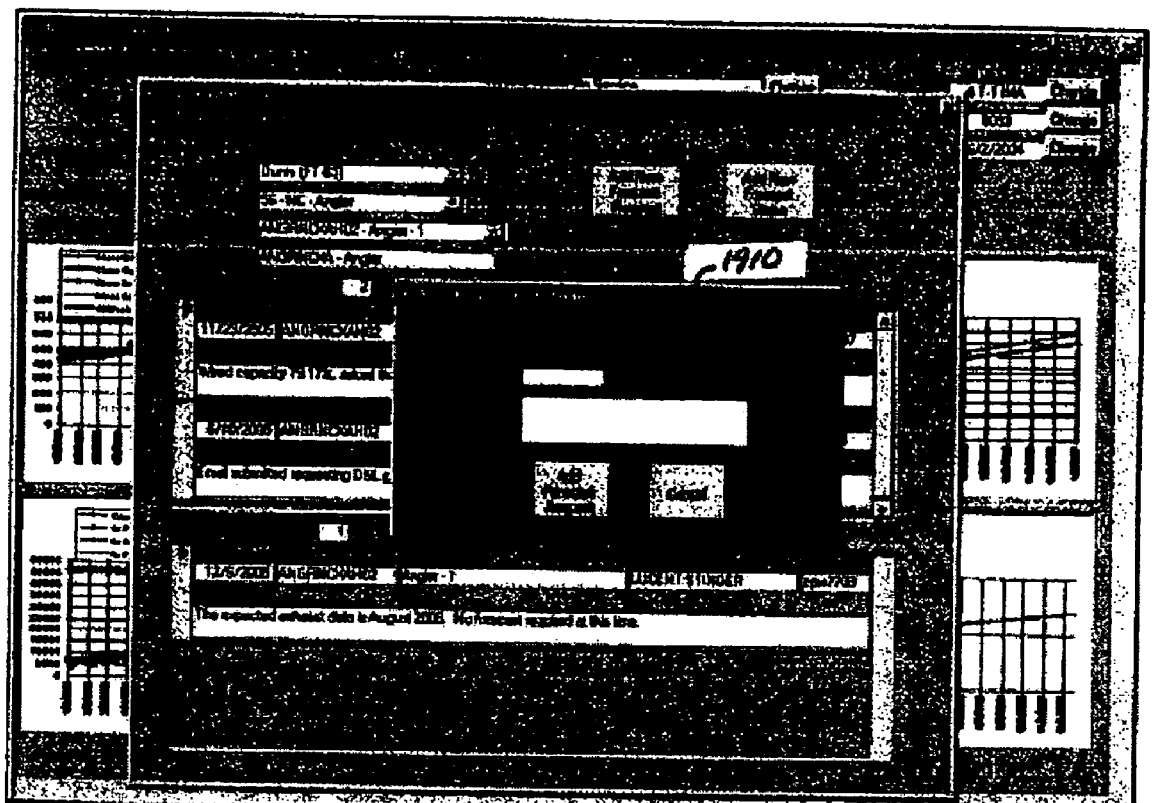
Figure 19C:
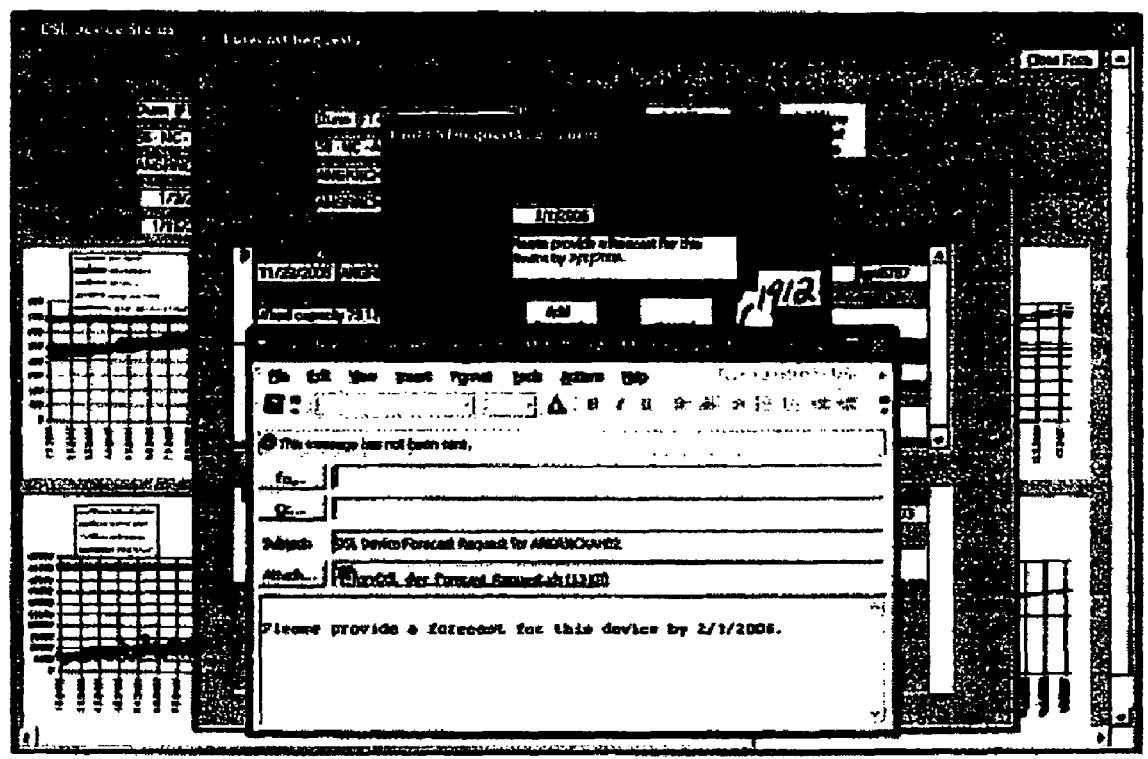
Figure 19D:
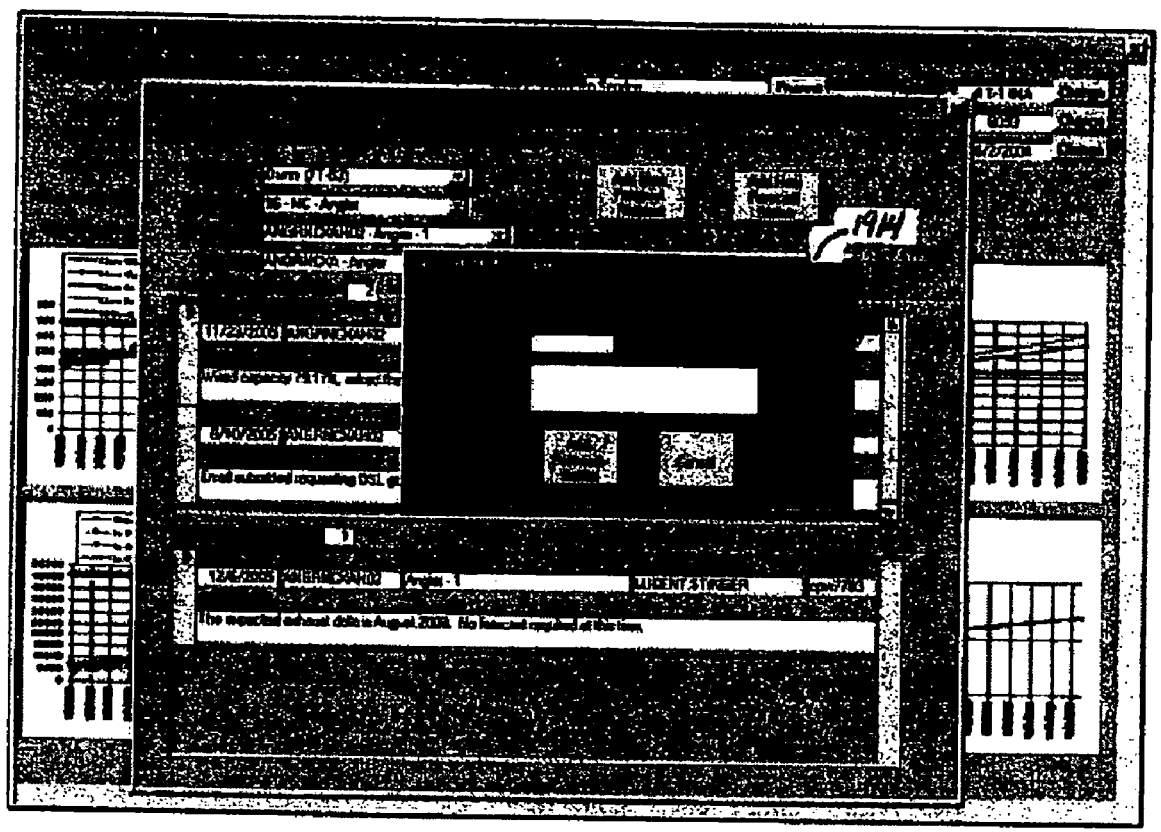

In step 1435, the user may select soft-button 1906 to enter request details for a new forecast request in a forecast request input form 1910 as shown in FIG. 19B. Once the request details are entered, the details and status are not user-changeable. Errors may be corrected by a DSL tracking tool administrator. As shown, input is minimal and various information, such as user ID and device identity, may be automatically generated. A forecast request email 1912 as shown in FIG. 19C may be created in step 1440. The email 1912 may attach a file, such as an Excel file, that identifies the DSL device for which the forecast is requested. Additionally, the device CLLI code may be included in the subject line and body of the email 1912. The recipient's email address is entered. The email message may be delivered in step 1445, which causes the forecast request to be saved in the tracking tool database. In step 1450, the user may select soft-button 1908 (FIG. 19A) to enter status details for a new forecast status via forecast status input form 1914 as shown in FIG. 19D. Similar to steps 1440 and 1445, a forecast status email may be created and delivered in steps 1455 and 1460. However, no information file is attached to the email in this case, but the subject line includes the device CLL1 code and the status information may be included in the body of the email. The user may attach an information file to the email.

In one embodiment, a forecast may consider area demographics, known or expected growth, such as new housing developments or apartment complexes, and any other social or governmental activity that could result in increases or decreases in service demand for service providers. In another embodiment, the system may provide a quick view of capacity sensitive aspects of DSL concentrating systems. When the quick view indicates the possibility of pending exhaust of the current DSL capacity, the user of the DSL Tracking System may request a forecast from a forecasting group. The system and/or the forecasting group may develop the forecasting information automatically, semi-automatically, or manually. Depending on the configuration information available, the forecast might indicate that service demand at a particular DSL serving device is almost at its peak and that growth is expected to level. For example a DSL serving device might be located in a neighborhood where 99% of the customers are already being served. Historical growth projections would indicate continued growth while a forecast would indicate growth is about to level out and additional DSL capacity is not required. The date selectors associated with the charts allow a user to narrow the range of history presented in the chart and causes the trend lines to be recalculated. Twelve months of history may generate a projected trend that shows growth, while the most recent four months of history could generate a projected trend that shows a loss of customers.

Figure 15:
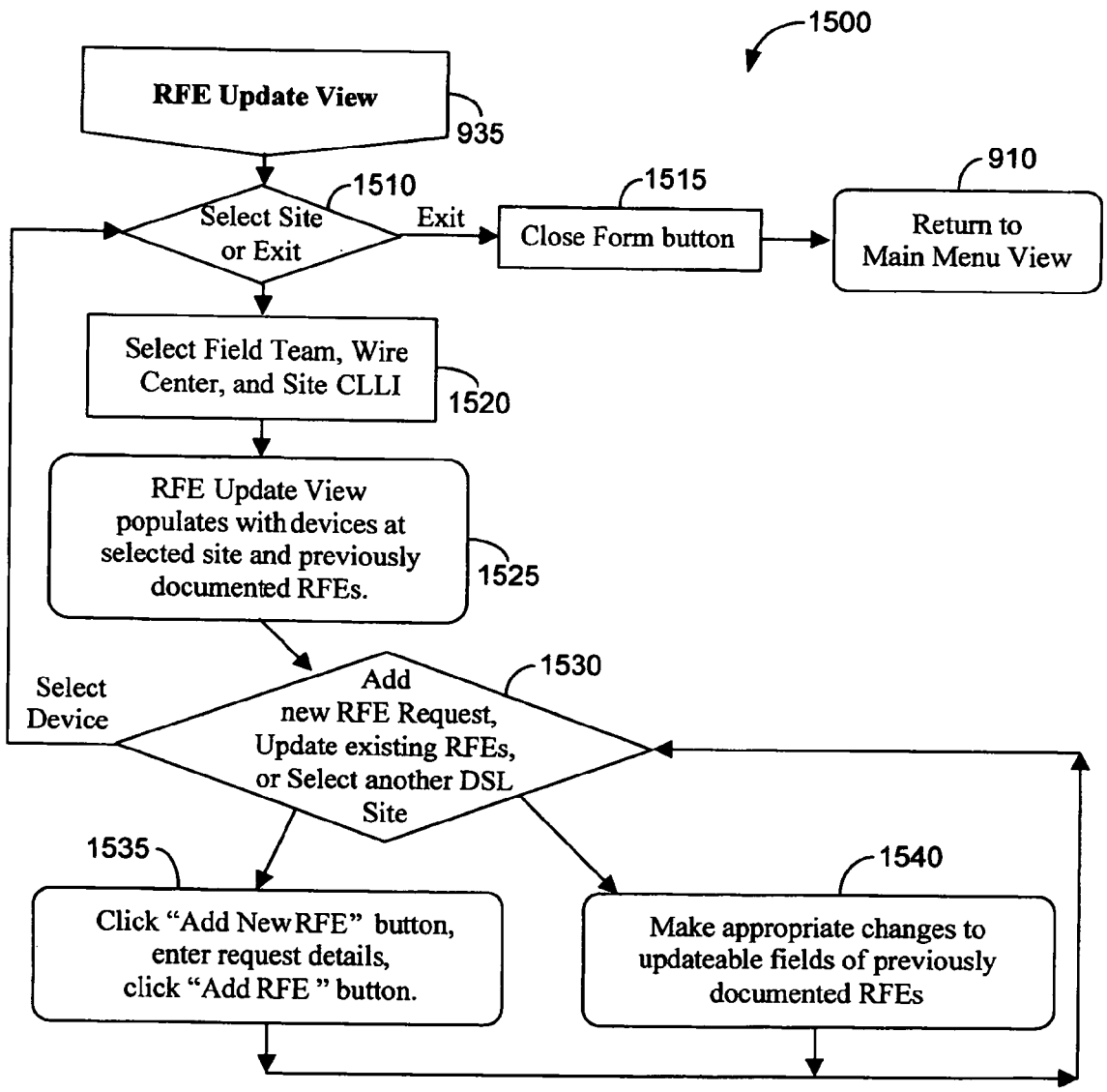
FIG. 15 is a flowchart of an exemplary process of an RFE Update Review implemented in an embodiment of the present invention.
Figure 21A:
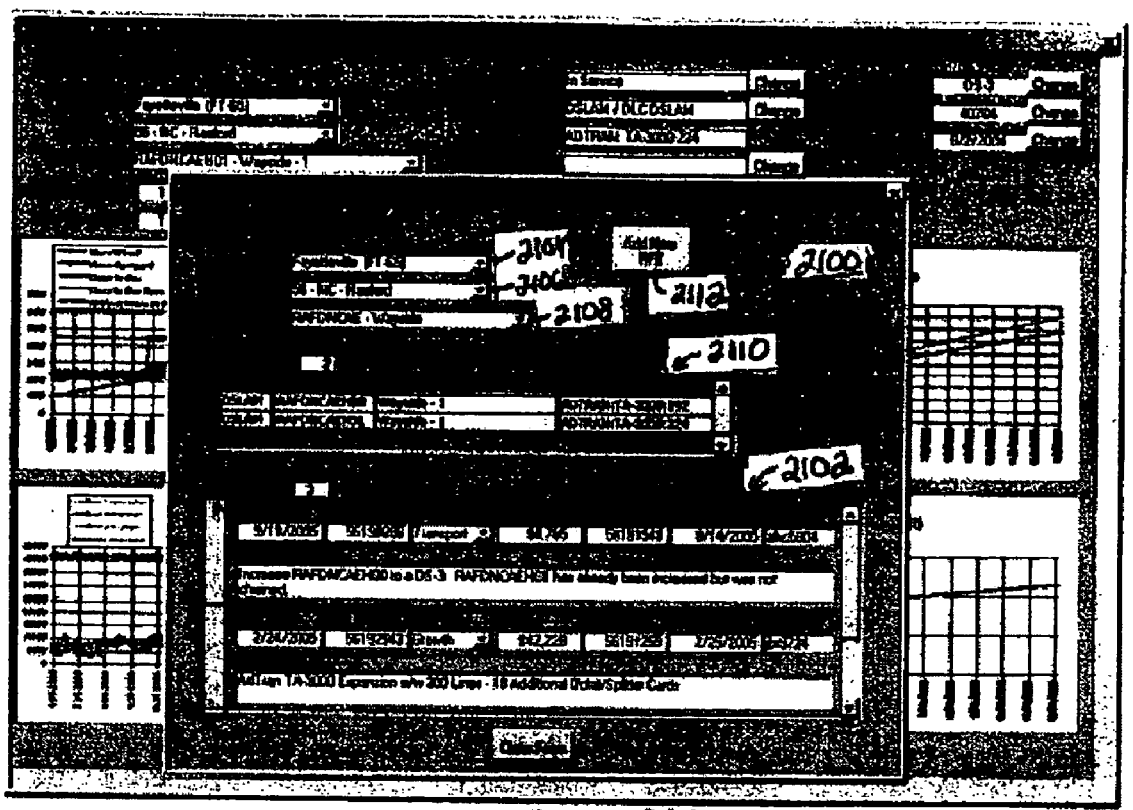
FIGS. 21A and 21B show an RFE Update Form for planners to display RFE requests that have been logged into the system.

In FIG. 15, a flow chart for an exemplary process 1500 for displaying an RFE Update View is shown. Before describing the process for displaying an RFE Update View, FIG. 21A shows an RFE Update Form 2100 for planners to display RFE requests 2102 that have been logged into the system. Planners issue an RFE when a DSL system needs to be expanded to support line growth or increases in transport capacity. RFEs can be documented in the tracking tool by clicking an "RFE Update" soft-button 323 (FIG. 3) that appears on both the DSL Device Status 300 (FIG. 3) and Log In/Main Menu views. Clicking the soft-button from either view opens the RFE Update form 2100. RFEs are associated with a deployment site rather than a specific device. As shown, dropdown menus are provided for a user to select a field team (e.g., "Fayetteville (FT-65)") 2104, wire center (e.g., "56-NC-Raeford") 2106, and DSL Site (e.g., "RAFDNCAE-Wayside") 2108. DSL devices associated with the field team, wire center, and DSL site are shown in a list 2110.

Figure 21B:
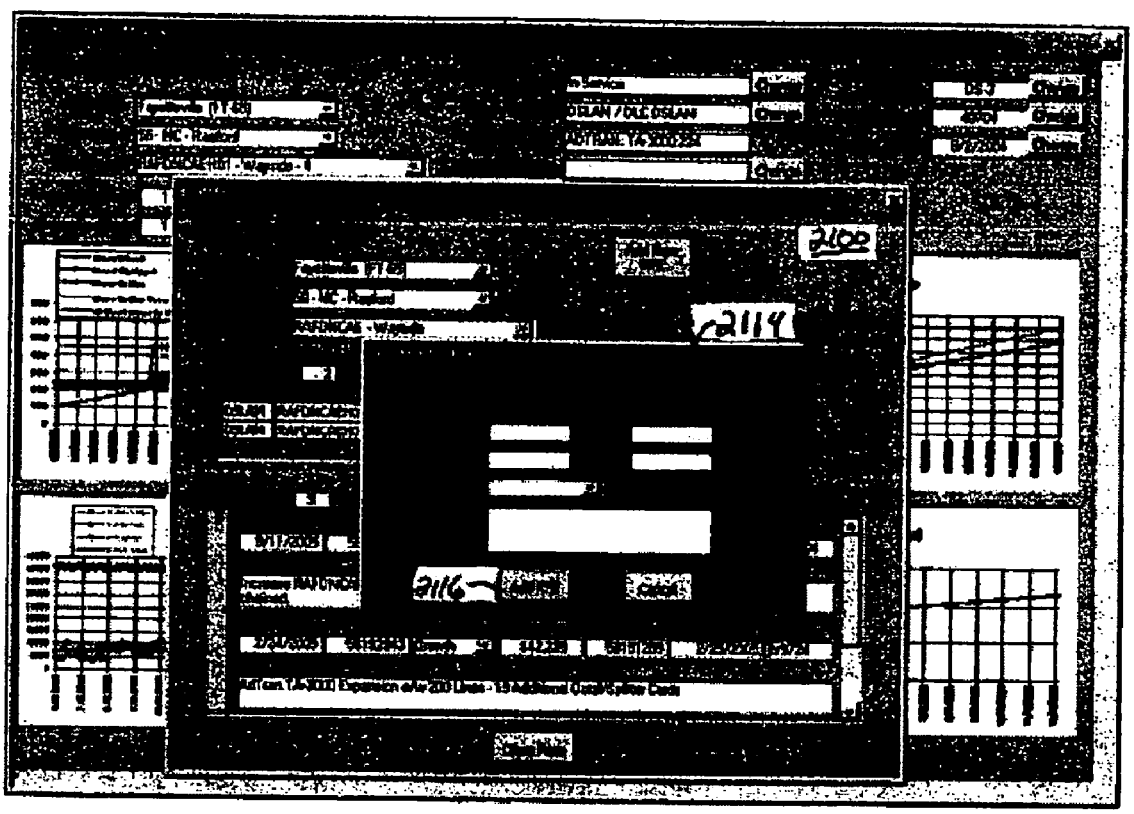

Clicking an "Add New RFE" soft-button 2112 opens an RFE Input Form 2104 in FIG. 21B. The RFE Input Form 2114 enables a user to enter details about an RFE, including RFE date, RFE number, RFE budget, RFE BC number, RFE Type, and comments. One or more of the entries may be provided in a dropdown menu or other pre-listed selection soft-tool as understood in the art. Other and/or additional input fields may be provided for the user to enter information for a new RFE. Once the input of a new RFE is complete, the user may click on an "Add RFE" soft-button 2116 to save the RFE information in the tracking tool database and to update the RFE Update Form 2100 with specifics of the newly entered RFE. The RFE Input Form 2114 may not initiate an e-mail if the RFEs are officially documented in another system. The entries of the RFE may be updated directly on the RFE Update Form 2100.

Referring again to FIG. 15, the process 1500 is a continuation of process 900 (FIG. 9) and begins with step 935 from FIG. 9. In one embodiment, the process 1500 uses the RFE Update View 2100 of FIG. 21. In step 1510, the user has an option to exit or to continue. If the user exits, a close form button is selected in step 1515 and the user is taken back to the main menu in step 910.

If the user continues in step 1510, the user may select field team, wire center, and site CLLI I in step 1520. RFE Update View may be populated with devices at selected sites and previously documented RFEs in step 1525. The user has another option to select whether to access another device, add new RFE request, or update existing RFEs in step 1530. In step 1535, the user may select a button to enter request details for a new RFE. In step 1540, the user may make changes to fields of previously documented RFEs.

Figure 16:
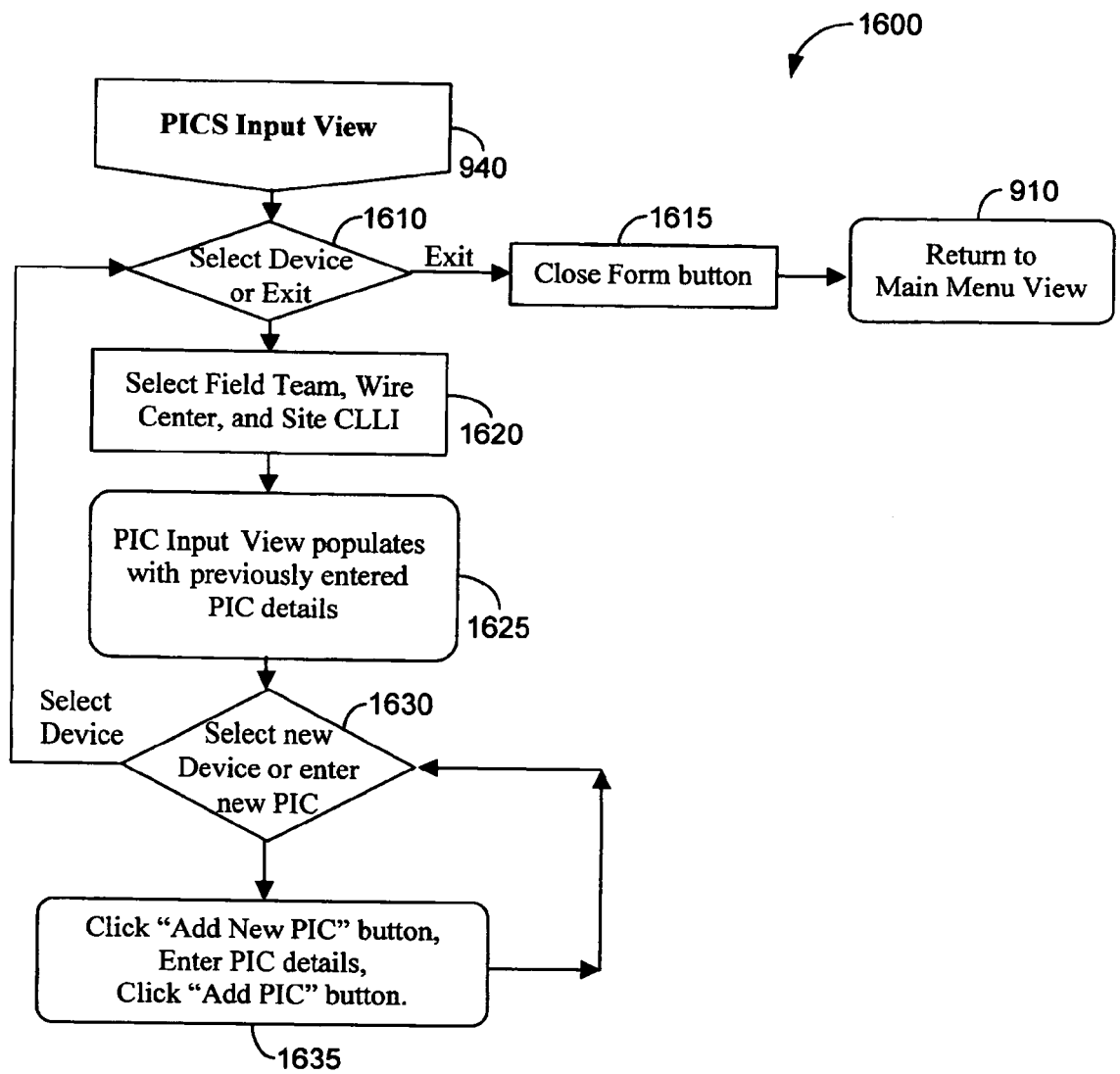
FIG. 16 is a flowchart of an exemplary process of a PICS Input View implemented in an embodiment of the present invitation.
Figure 22A:
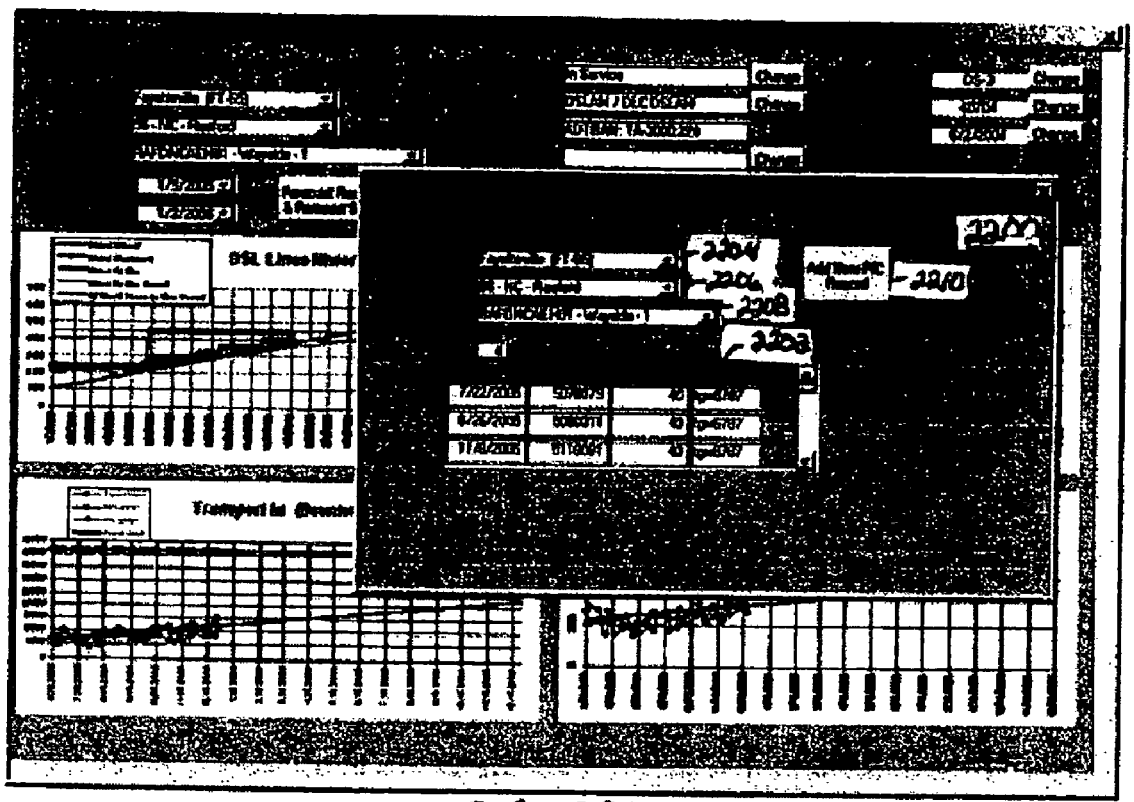
FIGS. 22A and 22B show a DSL PIC Tracking form that shows plug in cards in a list that have been added to the system.

In FIG. 16, a flow chart of an exemplary process 1600 for viewing a PICS Input View is shown. Before describing the process for displaying an PICS Input View, FIG. 22A shows a DSL PIC (plug-in-card) Tracking form 2200 that shows plug in cards in a list 2202 that have been added to the system. This form may be displayed by a user clicking on a "PICS Additions" soft-button 325 (FIG. 3) on both the DSL Device Status and Log In/Main Menu views. The list of PICs may include date, PIC number, lines added, and identifier of user who added the PIC information. Users may select a field team 2204, wire center 2206, and DSL Device 2208 for which to view plug in cards that have been installed.

Figure 22B:
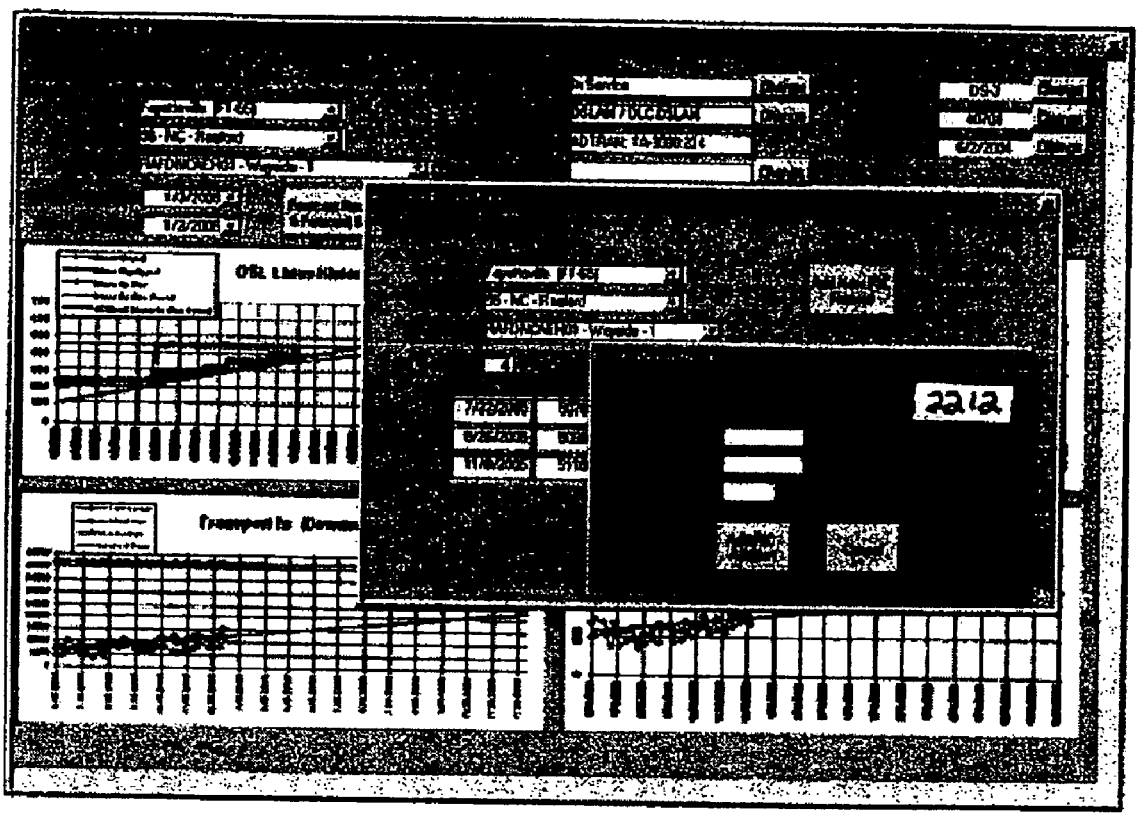

Clicking an "Add New PIC Record" soft-button 2210 on the DSL PICS Tracking form 2200 opens a PIC Addition Input Form 2212 in FIG. 22B. The PIC Addition Input Form 2212 enables a user to enter details about a PIC, including PIC date of installation, PIC number (e.g., serial number), and number of lines added. One or more of the entries may be provided in a dropdown menu or other pre-listed selection soft-tool as understood in the art. Other and/or additional input fields may be provided for the user to enter information for a PIC added to a DSL device. Once the input of a new PIC is complete, the user may click on an "Add PIC Addition" soft-button 2214 to save the PIC information in the tracking tool database and to update the DSL PIC Tracking Form 2200 with specifics of the newly entered PIC. The PIC Addition Input Form 2212 may not initiate an e-mail if the PICSs are officially documented in another system. The entries of the PIC may be updated directly on the DSL PIC Tracking Form 2200.

Continuing with FIG. 16, the process 1600 is a continuation of process 900 (FIG. 9) and begins with step 940 from FIG. 9. In one embodiment, the process 1600 uses the PICS Input View 2200 of FIG. 22A. In step 1610, the user has an option to exit or to continue. If the user exits, a close form button is selected in step 1615 and the user is taken back to the main menu in step 910.

If the user continues in step 1610, the user may select field team, wire center, and site CLLI in step 1620. A PICS Input View may be populated with previously entered PIC details in step 1625. The user has another option to select whether to access another device or enter a new PIC in a step 1630. In step 1635, the user may select a button to enter PIC details for a new PIC.

Figure 17:
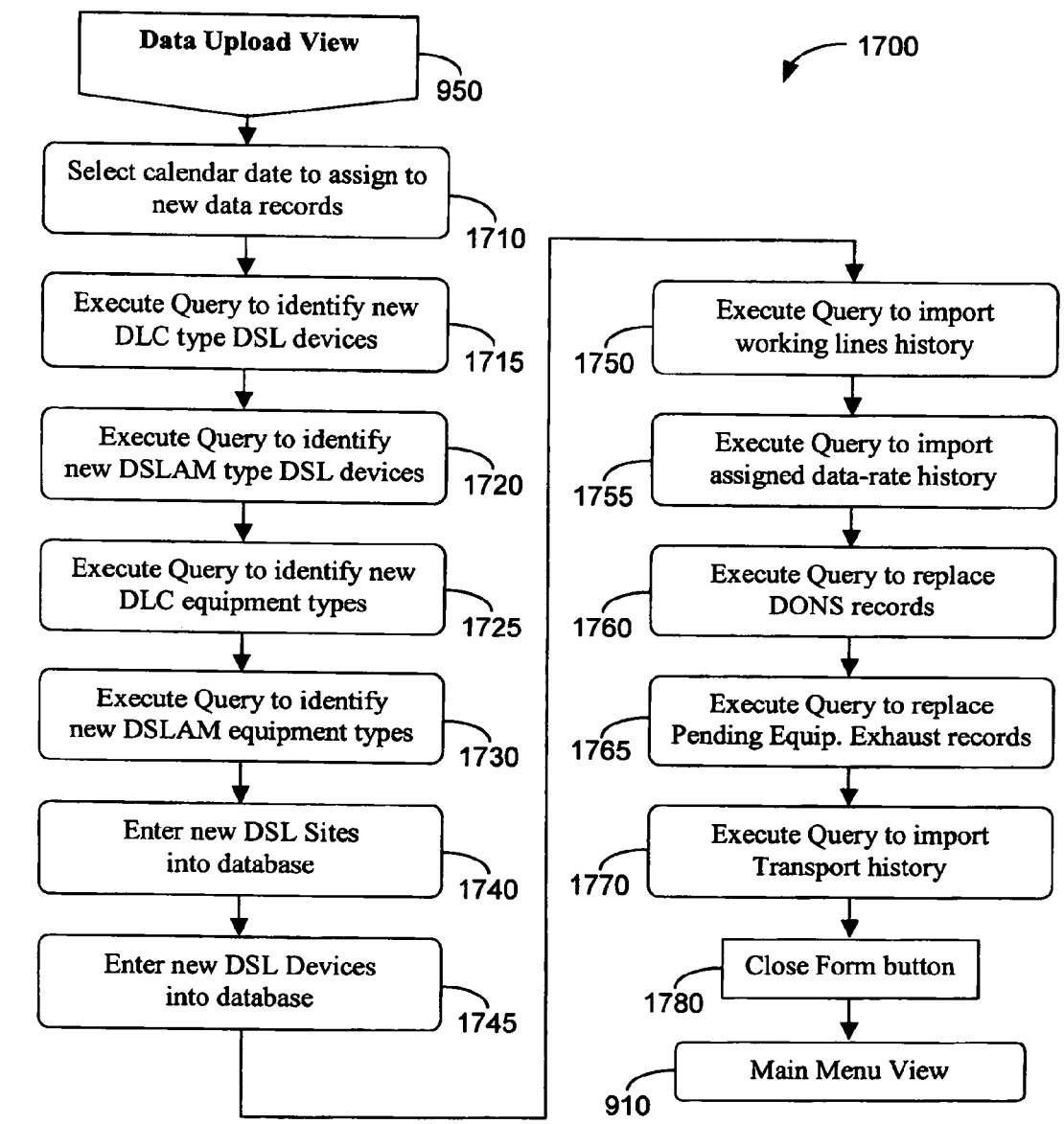
FIG. 17 is a flowchart of an exemplary process for a Data Upload View implemented in an embodiment of the present invitation.
Figure 23:
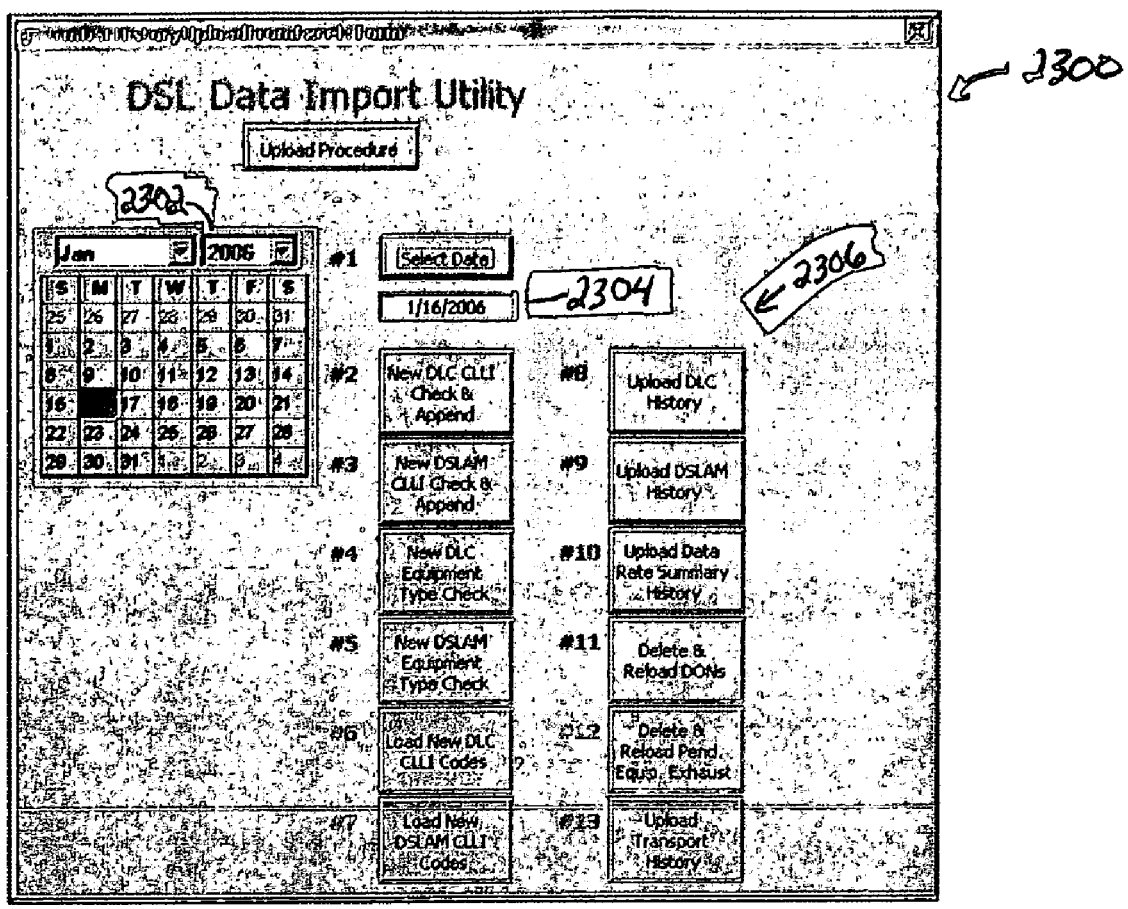
FIG. 23 shows a DSL Data Import Utility View that may be used to load DSL device history into the DSL tracking tool each week.

Turning now to FIG. 17, a flow chart of and exemplary process 1700 for viewing a Data Upload View is shown. Before describing the process for displaying a DSL Data Import Utility, FIG. 23 shows a DSL Data Import Utility View 2300 that may be used to load DSL device history into the DSL tracking tool each week. Prior to loading the history, new devices that have been placed in service are loaded into the DSL tracking tool. Special queries may be used to compare the devices listed on an input data file to the devices loaded in the DSL tracking tool. Devices not listed in the DSL tracking tool may be regarded as new device and are loaded into the DSL tracking tool. New devices often represent new sites and the new sites are loaded into the DSL tracking tool before the new devices can be loaded. Additionally, the input data files are checked for changes in device equipment type. Because of the large number of steps involved in loading the weekly data, a special view, as provided by the DSL Data Import Utility View 2300, may be used to ensure that all of the steps are completed in the proper order. The DSL Data Import Utility View 2300 may be available to tracking tool administrators.

As shown, the DSL Data Import Utility View 2300 may include a calendar 2302 from which a user may select a date 2304 or the user may simply type in the date in a date entry field 2304. One or more soft-buttons 2306 may be displayed to enable a user (e.g., tracking tool administrator) to select to cause a process, such as a query, check, upload, or otherwise, to occur to cause DSL data to be imported or otherwise verified. In an alternative embodiment, the process may be automated to perform each of the processes shown in the soft-buttons 2306 and a report generated for the tracking tool administrator.

Continuing with FIG. 17, the process 1700 is a continuation of process 900 (FIG. 9) and begins with step 950 from FIG. 9. In one embodiment, the process 1700 uses the DSL Data Import Utility 2300 of FIG. 23. In step 1710, the user may select a calendar date to assign to new data records. In step 1715, a query is executed to identify new DLC-type DSL devices. In step 1720, a query is executed to identify new DSLAM-type DSL devices. In step 1725, a query is executed to identify new DLC equipment types. In step 1730, a query is executed to identify new DSLAM equipment types.

Another aspect of process 1700 allows entry of new DSL sites and DSL devices into a database (like storage devices 110 and 213) in steps 1740 and 1745. Furthermore, In steps 1750, 1755, 1760, and 1765, queries may be executed to import working lines history, import assigned data-rate history, replace DONS records, replace pending equipment exhaust (capacity limit) records, and import transport history. As described in previous figures, the user may also select a close form button in step 1770 and return to the main menu in step 910.

Figure 18:
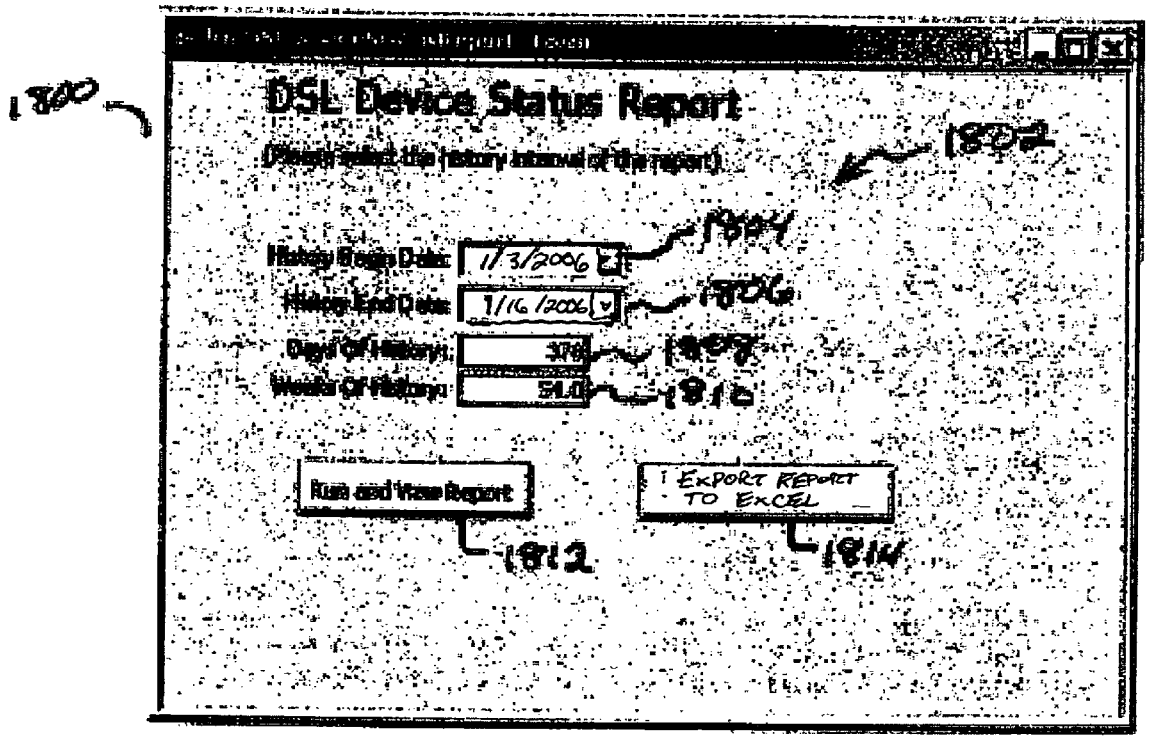
FIG. 18 is display of an exemplary graphical user interface that includes an input screen for requesting a DSL Device Status Report.

FIG. 18 displays an exemplary graphical user interface 1800 includes an input screen for requesting a DSL Device Status Report, as exemplified by Table I. A DSL Device Status Report may be available from the Log In/Main Menu. From a DSL Device Status Report view, a user can select the beginning and ending dates 1804 and 1806 of the report. Typically, the report is issued for the most recent thirteen weeks, or 91 days. However, changing the History Begin or History End date 1804 or 1806 causes the Days and Weeks of History 1808 and 1810 to change. A user may select either soft-buttons 1812 or 1814 to run and view a report in a database format, such as Microsoft Access® or Excel®.

A device status report may have over 80 columns of data for each DSL Device in the system. Most of the report information is available from the DSL Device Status view. In one embodiment, the report lists all devices rather than a single device. Table I is an exemplary compressed view of the fields of the DSL Device Status Report.

Figure 20:
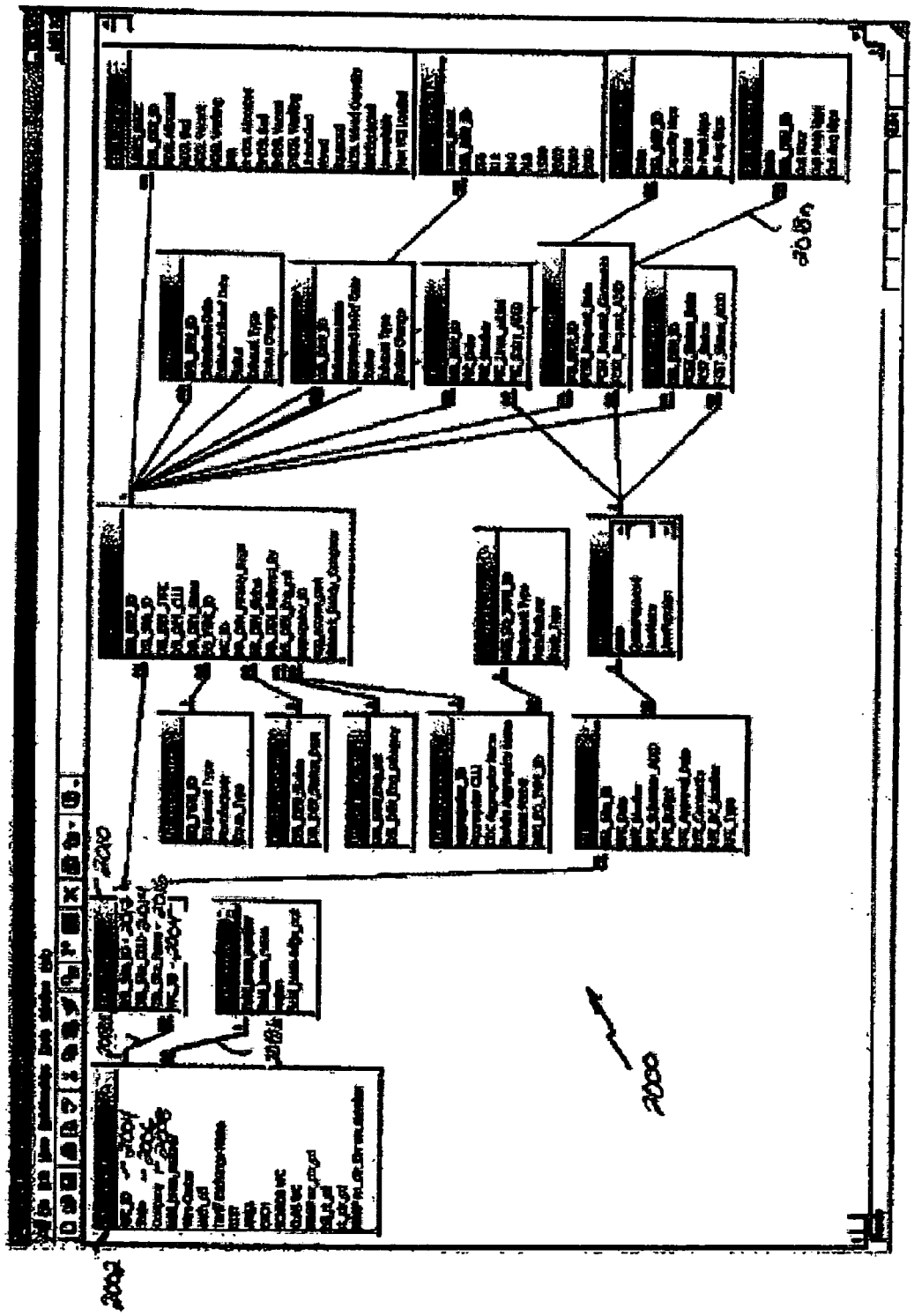
FIG. 20 is an exemplary database table relationship for implementing the principles of the present invention.

FIG. 20 is a database table illustrating an exemplary database relationship 1900 used for implementing the principles of the present invention. In one embodiment, the database is implemented utilizing Microsoft Access®. However, the database may be implemented utilizing other database software packages as understood in the art. As shown, there are a variety of records that include parameters to be filled by data or information associated with DSL operations of a service provider, DSL system, and customers of the DSL services. For example, a wire center is represented by record 1902 that includes a wire center ID ("WC_ID") parameter 1904, state parameter 1906, company parameter 1908, etc. A DSL site record 1910 may include parameters, such as DSL_site_ID 1912, DSL_site_CLLI 1914, DSL_site_name 1916, and WC_ID 1904, where the WC_ID parameter 1904 is used as a "key" between records, as understood in the art. Links 1918a-1918n between each of the records depicting the configuration of the database are shown and used to signify how the various records are related to one another. Other configurations, records, and parameters may be utilized in accordance with the principles of the present invention.

Tables II-XXII include data illustrative of information used to maintain a DSL system. Of course, the parameters and data shown are a partial exemplary listing as a full database would be many thousands of lines long and many columns wide.

TABLE I

DSL DEVICE STATUS REPORT

| | | | | | | | |
|---|---|---|---|---|---|---|---|
| Field Team Engineering Category | State DSL Dev Name | Company Manuf. | Wire Center Equipment Type | DSL Site CLLI Lines-Date Begin | DSL Dev CLLI Lines-Date End | DSL Dev Type Lines-In-Use Begin | Service Status Lines-In-Use End |
| ASDL Working Growth | ASDL Allocated Daily Growth | ADSL Bad Weekly Growth | SHDSL Working Equipped | SHDSL Allocated ADSL Wired Capacity | SHDSL Bad Wired | IMA ADSL Working Utilization | Days Wired Capacity Utilization |
| Equipped Utilization | Max VCI Loaded | Unused Wired | Weeks To Wired Exhaust | Wired Exhaust Date | Wired Exhaust Group | Relieved By | Lines in Use GT Equipped |
| Equipped GT Wired | DON Date | DON Est Relief | DON Status | DON Exhaust Type | Pend Exhaust Submitted | Pend Exhaust Est. Relief | Pend Exhaust Status |
| Pend Exhaust Type | Most Recent Growth RFE Date | Most Recent Growth RFE | Most Recent Transport RFE Date | Most Recent Transport RFE | Most Recent PIC | PIC Date | FCST Request Date |
| FCST Request Date | FCST Status Date | FCST Status | Assigned Date Begin | Assigned Date End | Subscribers Assigned Begin | Subscribers Assigned End | Assigned Date Rate Begin |
| Assigned Data Rate End | Days (Assigned) | Growth (Assigned) | Daily Growth (Assigned) | Over-Subscription Capacity | Over-Subscription Capacity Available | Over-Subscription Utilization | Weeks To Over-Subscription Exhaust |
| Over-Subscription Exhaust Date | Over-Subscription Exhaust Group | Transport In Date Begin | Transport In Date End | Transport In Avg. Begin | Transport In Avg. End | Transport In Peak Begin | Transport In Peak End |
| Transport Capacity | Transport In Avg. Utilization | Transport In Peak Utilization | Transport | Days (Transport In) | Growth (Transport In Peak) | Weeks To Transport In Peak Exhaust | Transport In Peak Exhaust Date |

TABLE II

| field_team_number | field_team_name | region | field_team_edge_out |
|---|---|---|---|
| 51 | Bristol | MAO | FT |
| 52 | Johnson City | MAO | FT |
| 54 | Charlottesville | MAO | FT |
| 56 | Martinsville | MAO | FT |

TABLE III

| A010 | QuotePassword | UserName | UserFunction | UserRegion |
|---|---|---|---|---|
| jhf8726 | ***** | Michael Fleenor | AD | MAO |
| mjh1934 | ****** | Mike Hovious | AP | MAO |
| mlp4269 | ****** | Mack Peel | AP | MAO |
| rci7554 | ****** | Randal Idol | AP | MAO |

TABLE V

| DSL_Site_ID | DSL_Site_CLLI | DSL_Site_Name | WC_ID |
|---|---|---|---|
| 1 | ABNGVABB | Exit Nineteen | 182105 |
| 2 | ABNGVABL | Woodcliff | 182105 |
| 3 | ABNGVABM | Spring Creek | 182105 |

TABLE VI

| DSL_DEV_Status | DSL_DEV_Status_Desc |
|---|---|
| 1 | In Service |
| 2 | To be Removed from Service |
| 3 | Removed from Service |

TABLE IV

| WC_ID | State | Company | field_team_number | Wire Center | exch_ed | Tariff Exchange Name | DIST | AREA | EXCH | SCXRDB WC | CLAS WC | MONP wr_ctr.ed |
|---|---|---|---|---|---|---|---|---|---|---|---|---|
| 174101 | SC | 17 | 59 | Beaufort | BUFT | Beaufort | BUFT | BUFT | BUFT | BUFT | BUFT | 4101 |
| 174102 | SC | 17 | 59 | Branchville | BCHV | Branchville | BUFT | BUFT | BHVL | BCHV | 4102 |
| 174103 | SC | 17 | 59 | Estill | ESTL | Estill | BUFT | BUFT | ESTL | ESTL | ESTL | 4103 |
| 174104 | SC | 17 | 59 | Eutawville | EUTV | Eutawville | BUFT | BUFT | ETVL | ETVL | EUTV | 4104 |
| 174105 | SC | 17 | 59 | St. Helena | STHE | St. Helena Island | BUFT | BUFT | STHL | STHL | FROG | 4105 |

TABLE VII

| DSL_DEV_Eng_cat | DSL_DEV_Eng_category |
|---|---|
| 1 | DSLAM |
| 2 | DLC DSLAM |
| 3 | DLC Integrated |

TABLE VIII

| DSL_DEV_Eng_cat | DSL_DEV_Eng_category |
|---|---|
| 1 | DSLAM |
| 2 | DLC DSLAM |
| 3 | DLC Integrated |

TABLE IX

| DSL_DEV_ID | DSL_Site_ID | DSL_DEV_TYPE | DSL_DEV_CLLI | DSL_DEV_Name | EQ_TYPE_ID | WC_ID |
|---|---|---|---|---|---|---|
| 1 | 5 | DSLAM | ABNGVAOJH00 | Old Jonesboro-1 | 20 | 182105 |
| 2 | 6 | DSLAM | ABNGVAXAH04 | Abingdon-1 | 22 | 182105 |
| 3 | 6 | DSLAM | ABNGVAXAH09 | Abingdon-2 | 22 | 182105 |
| 4 | 12 | DSLAM | AHSKNCXAH03 | Ahoskie-1 | 22 | 563101 |
| 5 | 13 | DSLAM | ALNDNCXAH03 | Aulander-1 | 9 | 563102 |

| DSL_DEV_ID | DSL_DEV_History_Begin | DSL_DEV_Status | DSL_DEV_Relieved_By |
|---|---|---|---|
| 1 | Jun. 2, 2004 | 1 | |
| 2 | Jun. 2, 2004 | 1 | ABNGVAXAH09 |
| 3 | Jun. 2, 2004 | 1 | |
| 4 | Jun. 2, 2004 | 1 | |
| 5 | Jun. 2, 2004 | 1 | ALNDNCXAH04 |

TABLE X

| EQ_TYPE_ID | Equipment Type | Manufacturer | Equip_Type |
|---|---|---|---|
| 1 | ADTRAN:DSL 24 | ADTRAN | DSL 24 |
| 2 | ADTRAN:DSL/192 | ADTRAN | DSL/192 |
| 3 | ADTRAN:DSL/224 | ADTRAN | DSL/224 |
| 4 | AFC:DMAX/EMAX | AFC | DMAX/EMAX |
| 5 | AFC:UMC(6 CARDS MAX) | AFC | UMC(6 CARDS MAX) |
| 6 | ALCATEL:ASAM | ALCATEL | ASAM |
| 7 | ALCATEL:LITESPAN:HSD | ALCATEL | LITESPAN:HSD |
| 8 | ALCATEL:MINI-RAM | ALCATEL | MINI-RAM |
| 9 | LUCENT:MRT | LUCENT | MRT |

TABLE XI

| Date | DSL_DEV_ID | Capacity kbps | In Hour | In Peak kbps | In Avg Kbps |
|---|---|---|---|---|---|
| Jan. 4, 2005 | 1 | 6093 | 20 | 1690 | 1418 |
| Jan. 9, 2005 | 1 | 6093 | 20 | 1454 | 168 |

TABLE XII

| Date | DSL_DEV_ID | Out Hour | Out Peak kbps | Out Avg kbps |
|---|---|---|---|---|
| Jan. 2, 2005 | 1 | 16 | 180 | 44 |
| Jan. 13, 2005 | 1 | 18 | 222 | 36 |

TABLE XIII

| Aggregator_ID | Aggregator CLL1 | CDC Aggregator Name | SwAdm Aggregator Name | Access Port_8 | AGG_EQ_TYPE_ID |
|---|---|---|---|---|---|
| 1 | CHVLVAXA10W | RBVACHVL02 | CHARLOTTESVILLE #2 | CHVLVA02 | 1 |
| 2 | CHVLVAXA12W | RBVACHVL10 | CHARLOTTESVILLE #10 | CHVLVA10 | 1 |

TABLE XIV

| AGG_EQ_TYPE_ | Equipment Type | 10 |
|---|---|---|
| 1 (Autonumber) | Redback | |

TABLE XV

| LINES_DATE | DSL_DEV-_ID | ADSL_Allocated | ADSL_Bad | ADSL Vacant | ADSL Working | IMA | SHDSL Allocated | SHDSL Bad | SHDSL Vacant | SHDSL Working |
|---|---|---|---|---|---|---|---|---|---|---|
| Jan. 3, 2005 | 1 | 1 | 3 | 266 | 18 | 0 | 0 | 0 | 0 | 0 |
| Jan. 3, 2005 | 2 | 25 | 3 | 2 | 306 | 0 | 0 | 0 | 0 | 0 |
| Jan. 3, 2005 | 3 | 1 | 1 | 46 | 144 | 48 | 0 | 0 | 0 | 0 |
| Jan. 3, 2005 | 4 | 1 | 6 | 94 | 307 | 0 | 0 | 0 | 0 | 0 |
| Jan. 3, 2005 | 5 | 1 | 1 | 0 | 34 | 0 | 0 | 0 | 0 | 0 |

TABLE XVI

| LINES_DATE | DSL_DEV_ID | 256 | 512 | 640 | 768 | 1500 | 2000 | 3000 | 5000 |
|---|---|---|---|---|---|---|---|---|---|
| May 2, 2005 | 1 | 0 | 15 | 0 | 0 | 12 | 0 | 1 | 0 |
| May 2, 2005 | 2 | 19 | 169 | 0 | 0 | 106 | 0 | 11 | 0 |
| May 2, 2005 | 3 | 0 | 105 | 0 | 0 | 60 | 0 | 11 | 0 |
| May 2, 2005 | 4 | 5 | 226 | 0 | 0 | 99 | 0 | 30 | 0 |
| May 2, 2005 | 5 | 1 | 19 | 0 | 0 | 13 | 0 | 1 | 0 |

TABLE XVII

| DSL_DEV_ID | PIC_Date | PIC_Number | PIC_Lines_added | PIC_Entry_ADID |
|---|---|---|---|---|
| 1 | Aug. 22, 2005 | 5080240 | 24 | tgw6787 |
| 3 | Jan. 23, 2006 | 6010262 | 48 | tgw6787 |
| 4 | Jul. 26, 2005 | 5070219 | 48 | tgw6787 |
| 4 | Jan. 10, 2006 | 60110063 | 48 | tgw6787 |
| 7 | Sep. 8, 2005 | 5090061 | 48 | tgw6787 |

TABLE XVIII

| DSL_DEV_ID | FCST_Request_Date | FCST_Request_Comments | FCST_Request_ADID |
|---|---|---|---|
| 666 | Jan. 16, 2006 | 0/4 Exhaust window, 94.27% capacity, forecast due Jan. 18, 2006, requested by Teri | tgw6787 |
| 671 | Jun. 14, 2005 | DSL forecast due by Jul. 18, 2005 to Juanita Rhodes | jbr9724 |
| 672 | Jan. 16, 2006 | 8/12 month exhaust window, 62.50% capacity, forecast due Jan. 30, 2006, requested by TGW | tgw6787 |
| 678 | Jan. 16, 2006 | 8/12 month exhaust window, 84.38% capacity, forecast due Jan. 30, 2006, requested by TGW | tgw6787 |
| 692 | Apr. 18, 2005 | Please provide a forecast for this site by May 2, 2005. Juanita | jb9724 |

TABLE XIX

| DSL_DEV_ID | FCST_Status_Date | FCST_Status | FCST_Status_ADID |
|---|---|---|---|
| 8 | Dec. 6, 2005 | The expected exhaust date is August 2008. No forecast required at this time. | cpw7703 |
| 36 | Dec. 6, 2005 | Anticipated exhaust is 1/2010 per Layne, which is in concert with the DSL Device Exhaust Report 20051128. | gtw6787 |
| 73 | Jul. 7, 2005 | Have determined that the DSL exhaust date will not occur until November 2006. No forecast is required at this time. | klo4215 |
| 73 | Dec. 5, 2005 | Have determined that the exhaust date will not occur until August 2008. No forecast is required at this time. | klo4215 |
| 82 | Jan. 30, 2006 | Forecast Submitted to TGW by SCH. | sch1455 |

TABLE XX

| DSL_DEV_ID | Submission | Estimated Relief | Status | Exhaust Type |
|---|---|---|---|---|
| 25 | Sep. 7, 2005 | Nov. 30, 2005 | In Progress | Shelf/System exhaust |
| 82 | Feb. 3, 2005 | | Un-Worked | Shelf/System exhaust |
| 149 | Dec. 19, 2005 | | Un-Worked | Shelf/System exhaust |
| 192 | Sep. 19, 2005 | May 31, 2006 | In Progress | Shelf/System exhaust |
| 221 | Sep. 23, 2005 | Mar. 15, 2006 | In Progress | Shelf/System exhaust |

TABLE XXI

| DSL_Site_ID | RFE_Date | RFE_Number | RFE_Submitted | RFE_Budget | RFE_Approval | RFE_Comments | RFE_BC_Number | RFE_Type |
|---|---|---|---|---|---|---|---|---|
| 17 | Feb. 16, 2005 | 5619278 | ahc5804 | 15141 | Feb. 23, 2005 | Add second DMAX shelf e/w 24 lines | 56191551 | Growth |
| 19 | Apr. 29, 2005 | 56194676 | ahc5804 | 2500 | Apr. 29, 2005 | Increase IMA links from 4 to 8 | 56191551 | Transport |
| 21 | Jun. 24, 2005 | 56196085 | ahc5804 | 2500 | Jun. 24, 2005 | Increase T-1 IMA links from 4 to 8 | 56191551 | Transport |
| 23 | Jan. 5, 2006 | 56201197 | tgw6787 | 76883 | Jan. 5, 2006 | Lucent Stinger - e/w 3 cards - in - svc date Oct. 5, 2006 | 56200216 | Growth |

TABLE XXII

| DSL_DEV_ID | Submission | Estimated Relief | Status | Exhaust Type |
|---|---|---|---|---|
| 1329 | Feb. 10, 2006 | | Un-Worked | DLC physical exhaust |
| 1329 | Feb. 10, 2006 | | Un-Worked | DLC physical exhaust |
| 1347 | Jan. 24, 2006 | Jan. 26, 2006 | Equipped | DLC physical exhaust |
| 1347 | Feb. 3, 2006 | Feb. 13, 2006 | In Progress | DLC physical exhaust |
| 1347 | Feb. 6, 2006 | Feb. 6, 2006 | In Progress | DLC physical exhaust |

TABLE XXIII

| DSL_DEV_ID | Submission | Estimated Relief | Status | Exhaust Type |
|---|---|---|---|---|
| 25 | Sep. 7, 2005 | Nov. 30, 2005 | In Progress | Shelf/System exhaust |
| 82 | Feb. 3, 2005 | | Un-Worked | Shelf/System exhaust |
| 149 | Dec. 19, 2005 | | Un-Worked | Shelf/System exhaust |
| 192 | Sep. 19, 2005 | May 31, 2006 | In Progress | Shelf/System exhaust |
| 221 | Sep. 23, 2005 | Mar. 15, 2006 | In Progress | Shelf/System exhaust |

TABLE XXIV

| DSL_DEV_ID | Submission | Estimated Relief | Status | Exhaust Type |
|---|---|---|---|---|
| 1329 | Feb. 10, 2006 | | Un-Worked | DLCl physica exhaust |
| 1329 | Feb. 10, 2006 | | Un-Worked | DLC physical exhaust |
| 1347 | Jan. 24, 2006 | Jan. 26, 2006 | Equipped | DLC physical exhaust |
| 1347 | Feb. 3, 2006 | Feb. 13, 2006 | In Progress | DLC physical exhaust |
| 1347 | Feb. 6, 2006 | Feb. 6, 2006 | In Progress | DLC physical exhaust |

The prior discussion is for illustrative purposes to convey exemplary embodiments. The steps discussed in FIGS. 9-17 may be executed without regards to order. Some steps may be omitted and some steps may be executed at a different time than shown. For example, step 930 may be executed before step 920, and step 1035 may be executed before step 1040. The point here is to convey that the figures are merely exemplary for the embodiments of the present invention and that other embodiments may be implemented.

Many different arrangements of the various components depicted, as well as components and views not shown, are possible without departing from the spirit and scope of the principles of the present invention. Embodiments of the present invention have been described with the intent to be illustrative rather than restrictive. Alternative embodiments will become apparent to those skilled in the art. A skilled artisan may develop alternative means of implementing the aforementioned improvements without departing from the scope of the principles of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for tracking a set of devices operating in one or more networks, comprising: collecting, by a computer, a set of data from the set of Digital Subscriber Line (DSL) devices to store into one or more databases, wherein collecting the set of data includes gathering data from other tracking systems; processing, by the computer, a subset of the set of data to generate operation data associated with at least one DSL device; displaying the operation data in a graphical format having a plurality of graphs simultaneously displayed to enable a user to view operation data in each of the graphs; displaying a chart containing data shown in the plurality of graphs in response to receiving a user request to view the chart; and updating the data shown in the plurality of graphs based on data received from the user; and processing, by the computer, a second subset of the set of data to generate operation data associated with a DSL site and display a second plurality of graphs to enable a user to view multiple parameters with regard to working lines associated with the DSL site, the DSL site identified based on a user selection of a Common Language Location Identifier (CLLI) code, a field team, and a wire center; and creating and tracking, by the computer, Request for Engineering (RFE) and Plug-In-Card (PIC) additions for the DSL site.

2. The method according to claim 1, wherein the chart includes data not shown in the plurality of graph.

3. The method according to claim 1, wherein the plurality of graphs includes a DSL lines history chart, an assigned services chart, a transport in chart, and a transport out chart for the at least one DSL device.

4. The method according to claim 3, wherein the transport in chart presents peak utilization, average transport utilization, device transport capacity, and associated trend lines for the at least one DSL device.

5. The method according to claim 4, wherein the peak utilization value is calculated based on a seven-day peak busy-hour for the at least one DSL device.

6. The method according to claim 3, wherein the assigned services chart presents historical information with regard to combined data-rate service levels assigned to customers for the at least one DSL device.

7. The method according to claim 6, wherein the combined data-rate service levels assigned to customers is calculated as a sum of a number of customers multiplied by their subscribed data-rate.

8. The method according to claim 3, wherein the assigned services chart includes a theoretical over-subscription assignment limit.

9. The method according to claim 8, wherein the theoretical over-subscription assignment limit is calculated as the at least one DSL device's transport capacity multiplied by an over-subscription factor.

10. The method according to claim 1, wherein information associated with the PICs include a date, PIC number, lines added, and identifier of a person who added the PIC information for the DSL site.

11. The method according to claim 1, wherein information associated with the RFEs include RFE date, RFE number, RFE budget, RFE BC number, and RFE Type.

* * * * *